US009946079B2

(12) United States Patent
Ozeki

(10) Patent No.: US 9,946,079 B2
(45) Date of Patent: Apr. 17, 2018

(54) METHOD OF CONTROLLING HEAD-MOUNTED DISPLAY THAT PROVIDES INFORMATION TO USER

(71) Applicant: Panasonic Intellectual Property Management Co., Ltd., Osaka (JP)

(72) Inventor: Akinori Ozeki, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 15/134,065

(22) Filed: Apr. 20, 2016

(65) Prior Publication Data
US 2016/0328881 A1 Nov. 10, 2016

(30) Foreign Application Priority Data

May 7, 2015 (JP) ................. 2015-095197

(51) Int. Cl.
G06T 19/00 (2011.01)
G02B 27/01 (2006.01)
G06F 1/16 (2006.01)
G06F 3/14 (2006.01)
G06F 3/01 (2006.01)

(52) U.S. Cl.
CPC ..... *G02B 27/0179* (2013.01); *G02B 27/0172* (2013.01); *G06F 1/163* (2013.01); *G06F 3/011* (2013.01); *G06F 3/012* (2013.01); *G06F 3/14* (2013.01); *G02B 2027/0187* (2013.01)

(58) Field of Classification Search
CPC ............ G02B 27/0179; G02B 27/0172; G02B 2027/0187; G06F 1/163; G06F 3/011; G06F 3/012; G06F 3/14
USPC ...................................... 345/8, 156
See application file for complete search history.

(56) References Cited

U.S. PATENT DOCUMENTS 6,346,929 B1 * 2/2002 Fukushima ............. G06F 3/017
345/156
7,199,934 B2 * 4/2007 Yamasaki .......... G02B 27/0093
345/7
8,228,315 B1 * 7/2012 Starner ................ G02B 27/017
345/175

(Continued)

FOREIGN PATENT DOCUMENTS

WO 2014/128751 8/2014

Primary Examiner — Benyam Ketema
(74) Attorney, Agent, or Firm — Greenblum & Bernstein, P.L.C.

(57) ABSTRACT

A method of causing a processor of a head-mounted display including a display device that displays an image to execute operations including receiving information indicating an inclination of the head-mounted display, determining a posture of the head-mounted display based on the received information indicating the inclination, in a case where the posture of the head-mounted display is first posture, controlling the display device to display a representing an operation process performed by a user and superimposed in a field of view of the user, and in a case where it is determined that the posture of the head-mounted display has changed from the first posture to a second posture, switching the image displayed on the display device to a second image having a display area smaller than that of the first image.

12 Claims, 16 Drawing Sheets

(56) References Cited

U.S. PATENT DOCUMENTS

| | | | | |
|---|---|---|---|---|
| 8,643,951 | B1* | 2/2014 | Wheeler | G06F 3/012 |
| | | | | 359/630 |
| 9,523,854 | B2* | 12/2016 | Kuriya | G06F 3/012 |
| 2003/0074119 | A1* | 4/2003 | Arlinsky | B60K 35/00 |
| | | | | 701/36 |
| 2006/0044265 | A1* | 3/2006 | Min | G02B 27/017 |
| | | | | 345/156 |
| 2011/0158478 | A1* | 6/2011 | Yamada | G02B 6/0006 |
| | | | | 382/103 |
| 2011/0245670 | A1* | 10/2011 | Tashiro | G01S 7/52084 |
| | | | | 600/443 |
| 2012/0050143 | A1* | 3/2012 | Border | G09G 3/3611 |
| | | | | 345/8 |
| 2012/0062444 | A1* | 3/2012 | Cok | G02B 27/0172 |
| | | | | 345/8 |
| 2014/0085203 | A1* | 3/2014 | Kobayashi | G01S 19/14 |
| | | | | 345/158 |
| 2014/0300633 | A1* | 10/2014 | Sako | G06K 9/00671 |
| | | | | 345/633 |
| 2014/0364212 | A1* | 12/2014 | Osman | A63F 13/213 |
| | | | | 463/31 |
| 2015/0009132 | A1* | 1/2015 | Kuriya | G06F 3/012 |
| | | | | 345/156 |
| 2015/0049002 | A1* | 2/2015 | Ishikawa | G02B 27/0172 |
| | | | | 345/8 |

\* cited by examiner

METHOD OF CONTROLLING HEAD-MOUNTED DISPLAY THAT PROVIDES INFORMATION TO USER

BACKGROUND

1. Technical Field

The present disclosure relates to a display control method, a head-mounted display, and a program.

2. Description of the Related Art

A head-mounted display is disclosed which provides desired information to a user based on a posture of the head-mounted display (see, for example, International Publication No. 2014/128751).

SUMMARY

However, a further improvement is necessary in the technique disclosed in International Publication No. 2014/128751.

In one general aspect, the techniques disclosed here feature that a method causes a processor of a head-mounted display including a display device that displays an image so as to be superimposed in a field of view of a user to execute an operation including receiving information indicating an inclination of the head-mounted display, judging a posture of the head-mounted display based on the received information indicating the inclination, in a case where the posture of the head-mounted display is a first posture, displaying on the display device a first image representing an operation process performed by the user, and in a case where it is determined that the posture of the head-mounted display has changed from the first posture to a second posture, switching the image displayed on the display device to a second image having a display area smaller than that of the first image.

The above-described general aspect allows it to achieve a further improvement.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
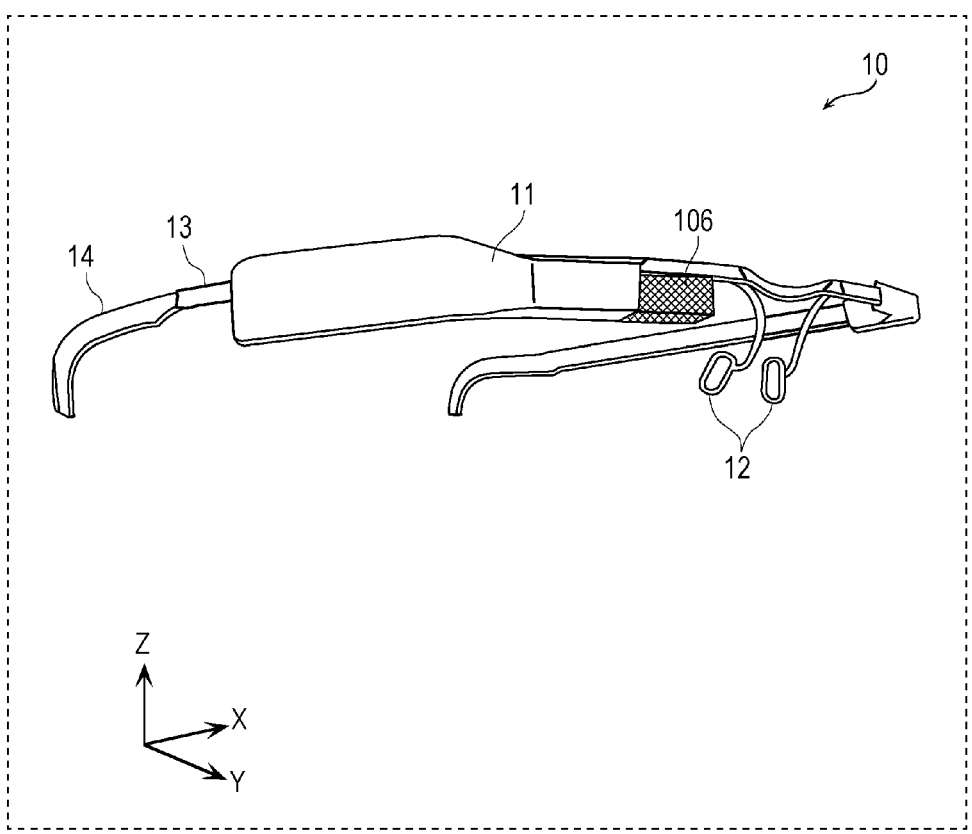
FIG. 1 is an external view of a head-mounted display according to a first embodiment.

Underlying Knowledge Forming Basis of the Present Disclosure

The inventor of the present invention has realized that problems described below may occur in the head-mounted display described above in the section "2. Description of the Related Art".

Nowadays, portable information terminals such as a smartphone, a tablet device, and the like are widely used. Users use these portable information terminals to search for information and use effectively retrieved information in their daily lives. For example, a user may use a portable information terminal to search for information related to something interesting or strange the user wants to know, information needed to solve a problem, or the like. As described above, users are allowed to use portable information terminals to solve problems or to obtain information necessary in daily lives. A user may search for a route from a current location to a destination using a map application on a portable information terminal and may get to the destination according to information displayed on the portable information terminal which in this case functions as a navigation system. Nowadays, as described above, people live in an environment in which they are allowed to easily get information using portable information terminals at any time they want, and thus many people receive a lot of benefits.

A large majority of portable information terminals widely used nowadays are terminals such as a smartphone, a tablet, and the like designed to be handled in a hand of a user. In many situations, a user is likely to browse information displayed on a portable information terminal while holding the portable information terminal in his/her hand.

On the other hand, in a particular situation, a user may want to get information from a portable information terminal while maintaining his/her both hands free without holding the portable information terminal in his/her hand. For example, such a situation may occur in a use case where cooking is performed while watching a cooking recipe on a portable information terminal, or in a use case where in a production line, an operation of assembling parts is performed while seeing a processing flow on a portable information terminal or in other use cases. In such use cases, when a user wants to see information, the user needs to take off his/her eyes off his/her hand, temporarily stop an operation, and see information displayed on a portable information terminal. Thus a reduction may occur in working efficiency. Furthermore, a user may want to compare a current operation state with information about the processing procedure obtained via portable information terminal. In such a situation the user needs to perform a complicated operation such as looking at the user's hand and the portable information terminal alternately.

International Publication No. 2014/128751 discloses a portable information terminal (head-mounted display apparatus (HMD)) that allows a user to obtain information in a state in which both hands are free without holding the portable information terminal.

International Publication No. 2014/128751 also discloses an HMD that allows it switch display information depending on a direction of the HMD (a direction of a head of a user wearing the HMD). However, although the technique disclosed in International Publication No. 2014/128751 allows it to change the displayed information depending on the direction of the HMD, some information (information displayed after the switching) is displayed regardless of the eye direction of the user. Therefore, in a case where seeing information and performing an operation are performed alternately by a user, it is necessary to turn on/off the information at each transition between the alternate operations, which results in a reduction in working efficiency. On the other hand, in a case where a user performs an operation while seeing information, the displayed information may interfere with vision of the user.

In view of the above, methods are provided herein to improve functions of the head-mounted display.

In an aspect, the present disclosure provides a method of causing a processor of a head-mounted display including a display device that displays an image so as to be superimposed in a field of view of a user to execute an operation including receiving information indicating an inclination of the head-mounted display, judging a posture of the head-mounted display based on the received information indicating the inclination, in a case where the posture of the head-mounted display is a first posture, displaying on the display device a first image representing an operation process performed by the user, and in a case where it is determined that the posture of the head-mounted display has changed from the first posture to a second posture, switching the image displayed on the display device to a second image having a display area smaller than that of the first image.

In the aspect described above, in the case where the posture of the head-mounted display is the first posture, the first image representing the operation process performed by the user is displayed on the display device, while in the case where it is determined that the posture of the head-mounted display has changed from the first posture to the second posture, the image displayed on the display device is switched to the second image having the display area smaller than that of the first image. That is, based on the posture of the head-mounted display whose direction changes together with a change in direction of a face of a user, displaying is controlled, for example, as to whether an operation process is displayed over the entire area or in a partial area of the display device of the head-mounted display. Thus, in a case where the user performs an operation at hand, it is allowed to change an image displayed on the display device simply by changing the direction of the face while maintaining the state of the hands. For example, it is allowed to switch between a state in which a large image representing an operation process is displayed to allow a user to understand the details of the operation process and a state in which a small or simplified image representing the operation process is displayed such that the image does not interfere with the operation of the user without the user to have to stop the operation and move his/her hand off, for example, to manually turn on/off an input device such as a button or the like provided on the device to switch the image displayed on the display device.

For example, in the switching to the second image, the first image may be switched to the second image which is a simple image representing in a simplified fashion the operation process represented in the first image.

For example, the first image and the second image each may include a text, and in the switching to the second image, the amount of text of the first image is reduced so as to represent in a simplified fashion the operation process represented in the first image and a resultant simplified image may be displayed as the second image.

For example, the first image may represent a plurality of operation processes, and in the switching to the second image, the first image may be switched to the second image which is an image obtained by deleting at least one operation process of the plurality of operation processes.

For example, the first image may represent a plurality of operation processes, and in the switching to the second image, the first image may be switched to the second image which is an image including a content representing in a simplified fashion at least one operation process of the plurality of operation processes.

For example, the first image may represent a plurality of operation processes, and in the switching to the second image, the first image may be switched to the second image which is an image including a content representing in a simplified fashion each operation process of the plurality of operation processes.

For example, the operation executed by the processor of the head-mounted display may further include, in a case where it is determined that after the image displayed on the display device has been changed from the first image to the second image, the posture of the head-mounted display has changed from the second posture to the first posture, switching the image displayed on the display device from the second image to the first image.

The operation executed by the processor of the head-mounted display may further include measuring time elapsed from an occurrence of a change in the posture of the head-mounted display from the first posture to the second posture, in a case where it is determined that after the elapsed time measured has reached a predetermined value, the posture of the head-mounted display has changed from the second posture to the first posture, switching the image displayed on the display device from the second image to a third image, wherein the third image represents an operation process next to the operation process represented in the first image.

For example, in the switching to the third image, the predetermined value may vary depending on the content represented in the first image.

For example, the operation executed by the processor of the head-mounted display may further include, in a case where it is determined that the posture of the head-mounted display has changed from the first posture or the second posture to a third posture, switching the image displayed on the display device to a fourth image representing a complete state of the operation process represented in the first image.

For example, the operation process represented in the first image and the second image may be one of a cooking operation process of a recipe, an operation process of attaching an electronic part, an operation process of an operation using a device or an appliance, an operation process associated with repair or maintenance of a device, an operation process associated with repair or maintenance of an appliance, and an operation process associated with repair or maintenance of a building.

For example, the operation executed by the processor of the head-mounted display may further include receiving the first image and the second image via a network from an information processing apparatus connected to the head-mounted display.

For example, the operation executed by the processor of the head-mounted display may further include receiving the first image via a network from an information processing apparatus connected to the head-mounted display, and generating the second image based on the received first image.

In an aspect, the present disclosure provides a head-mounted display including a display device that display an image so as to be superimposed in a field of view of a user, a processor, and a memory having a program stored thereon, the program causing the processor to execute operations including detecting information indicating an inclination of the head-mounted display, determining a posture of the head-mounted display based on the detected information indicating the inclination, in a case where the posture of the head-mounted display is a first posture, displaying on the display device a first image representing an operation process performed by the user, in a case where the posture judgment unit determines that the posture of the head-mounted display has changed from the first posture to a second posture, switching the image displayed on the display device from the first image to a second image having a display area smaller than that of the first image.

In an aspect, the present disclosure provides a non-transitory recording medium having a program stored thereon, the program causing a processor to execute operations including receiving information indicating an inclination of a head-mounted display including a display device that displays an image so as to be superimposed in a field of view of a user, determining a posture of the head-mounted display based on the received information indicating the inclination, in a case where the posture of the head-mounted display is a first posture, displaying on the display device a first image representing an operation process performed by the user, and in a case where it is determined that the posture of the head-mounted display has changed from the first posture to a second posture, switching the image displayed on the display device to a second image having a display area smaller than that of the first image.

Next, referring to accompanying drawings, specific embodiments of the present disclosure are described in terms of the display control method and other related issues.

Note that the embodiments described below are merely examples of the present disclosure. That is, in the embodiments described below, values, shapes, materials, constituent elements, locations of the constituent elements and manners of connecting the constituent elements, steps, the order of steps, and the like are described by way of example but not limitation. Among constituent elements described in the following embodiments, those constituent elements that are not described in independent claims indicating highest-level concepts of the present disclosure are optional.

First Embodiment

A first embodiment s described below with reference to FIG. 1 to FIG. 9B.

1-1. Configuration

In the present embodiment, a description is given as to a head-mounted display capable of properly providing information desired by a user. More specifically, the head-mounted display displayed below is capable of continuing, in response to an operation performed by a user, displaying information that needs to be displayed for a relatively long time to allow the user to understand.

FIG. 1 is an external view of a head-mounted display according to a first embodiment.

As shown in FIG. 1, the head-mounted display 10 is an eyeglass-type terminal allowed to be mounted on a head of a user in a manner similar to that in which an eyeglass is worn. The head-mounted display 10 includes a main part 11, nose pads 12, temples 13, and ear hooks 14.

The main part 11 is a processing unit that performs information processing by the head-mounted display 10 and displays an image or the like. The main part 11 is connected to a part of the temple 13. When a change occurs in a position or posture of a head of a user, the position or posture of the main part 11 changes together with the head of the user. Functions and processes associated with the main part 11 will be described in detail below.

The nose pads 12 are for fixing the head-mounted display 10 to a specific location on the head of the user. More specifically, the nose pads 12 are positioned such that a nose of the user is located between the nose pads 12 thereby fixing the head-mounted display 10 to the specific location on the head of the user.

The temples 13 are bar-shaped elements each connecting one nose pad 12 to corresponding one ear hook 14.

The ear hooks 14 are fixing the head-mounted display 10 to a specific location on the head of the user. More specifically, each ear hook 14 is placed so as to hook on a corresponding ear of the user thereby fixing the head-mounted display 10 to the specific location on the head of the user.

As described above, the nose pads 12 and the ear hooks 14 function as a fixing part for fixing the head-mounted display 10 to a particular location on a head of a user. Note that the specific location on the head of the user is such a position on the head of the user that a display surface of the display 106 of the main part 11 of the head-mounted display 10 is located opposing an eye of the user.

Directions may be defined such that an X direction is defined as a depth direction as seen by a user wearing the head-mounted display 10, a Y direction is defined by a right-left direction as seen by the user, and a Z direction is defined by a direction extending through the head and the foot. Note that a positive Z direction is also referred to as an upward direction and a negative Z direction is also referred to a downward direction unless otherwise stated.

Note that the shape of the head-mounted display 10 shown in FIG. 1 is merely an example, and other shapes may be employed as long as it is allowed to mount the head-mounted display 10 on at least a part of the head of the user so as to allow it to provide an image to the user. For example, a cap shape, a helmet shape, etc., may be employed.

Figure 2:
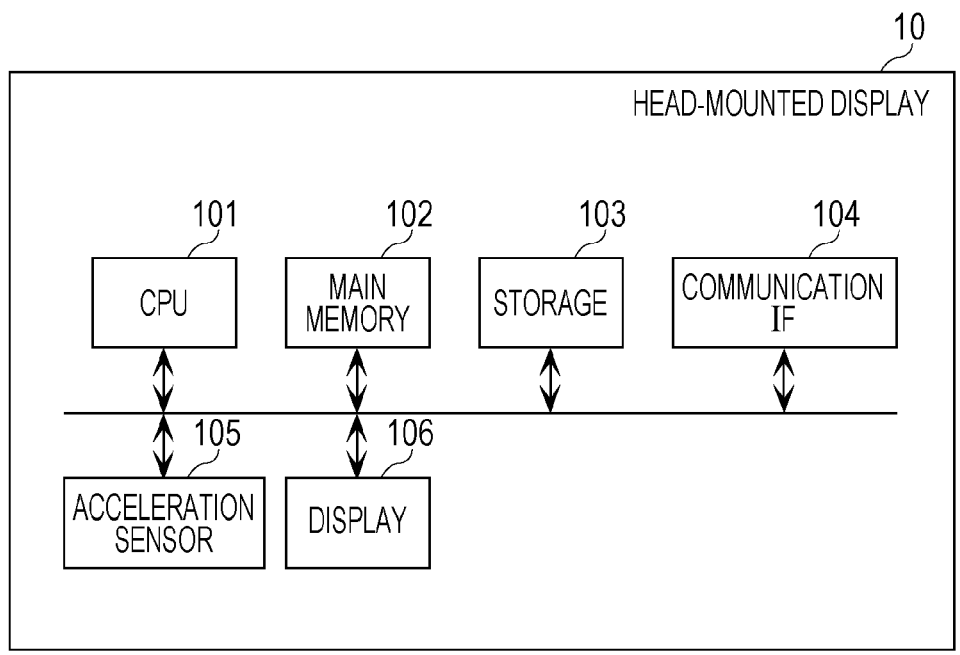
FIG. 2 is a block diagram illustrating a hardware configuration of the head-mounted display according to the first embodiment.

FIG. 2 is a block diagram illustrating a hardware configuration of the head-mounted display according to the first embodiment.

As shown in FIG. 2, the head-mounted display 10 has a hardware configuration including a central processing unit (CPU) 101, a main memory 102, a storage 103, a communication interface (IF) 104, an acceleration sensor 105, and a display 106.

The CPU 101 is a processor that executes a control program stored in the storage 103 or the like.

The main memory 102 a volatile storage area used as a work area when the CPU 101 executes the control program.

The storage 103 is a nonvolatile storage area storing the control program, a content, and the like.

The communication IF 104 is a network interface for transmitting and receiving data to or from another apparatus via a network. The communication IF 104 is, for example, a wireless local area network (LAN) interface according to the IEEE 802.11a/b/g standard.

The acceleration sensor 105 is a sensor that detects acceleration.

The display 106 is a transmissive display apparatus for displaying an image. The display 106 is, for example, a prims display that provides an image to a user using a half mirror. That is, the display 106 is a display device that displays an image so as to be superimposed in a field of view of a user. Note that there is no particular restriction on the type of the display 106 as long as it is possible to provide an image to a user. For example, a retinal scanning display that provides an image to a retina of a user using laser light may be used.

Figure 3:
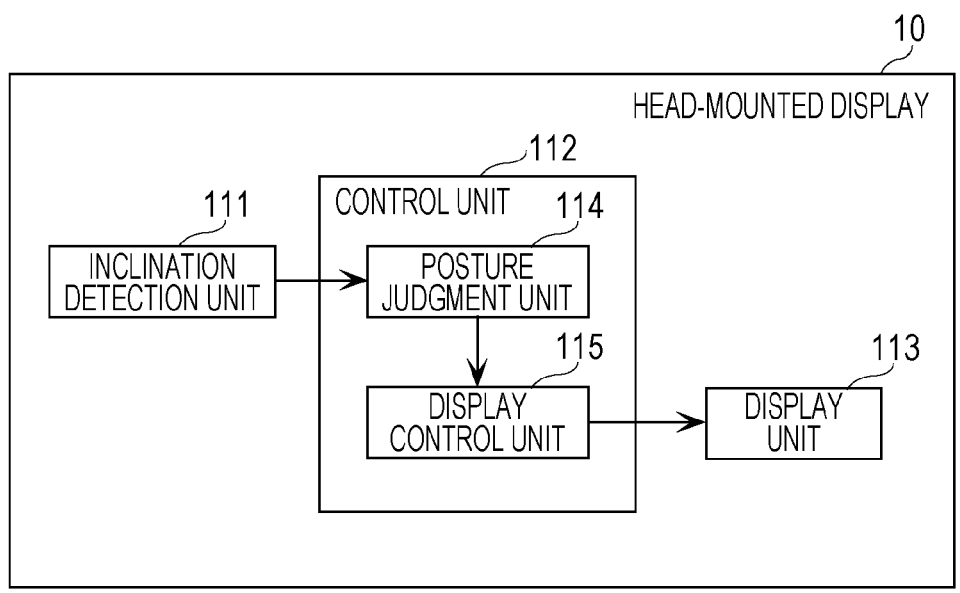
FIG. 3 is a block diagram illustrating a functional configuration of the head-mounted display according to the first embodiment.

FIG. 3 is a block diagram illustrating a functional configuration of the head-mounted display according to the first embodiment.

As shown in FIG. 3, the head-mounted display 10 has a functional configuration including an inclination detection unit 111, a control unit 112, and a display device 113.

The inclination detection unit 111 detects information indicating an inclination of the head-mounted display 10. More specifically, the inclination detection unit 111 detects a posture of the head-mounted display 10 using the acceleration sensor 105. The inclination detection unit 111 is realized using the acceleration sensor 105 and the like.

The control unit 112 is a processing unit that acquires information indicating the inclination (hereinafter referred to as inclination information) from the inclination detection unit 111 and controls displaying an image on the display device 113 according to the acquired inclination information. More specifically, the control unit 112 controls the displaying such that various kinds of images are displayed on the display device 113. The image may be an image output by the control unit 112 by executing a particular application for outputting the images, or may be a predetermined image. Alternatively, the image may be an image acquired from the outside via the communication IF 104. The control unit 112 includes a posture judgment unit 114 and a display controller 115. The control unit 112 is realized with the CPU 101, the main memory 102, the storage 103, and the like.

The posture judgment unit 114 of the control unit 112 received inclination information detected by the inclination detection unit 111 and judges the posture of the head-mounted display 10 based on the received inclination information. More specifically, the posture judgment unit 114 judges the posture of the head-mounted display and a change in the posture based on the received inclination information, and generates posture information indicating a result of the determination.

The posture of the head-mounted display 10 has a one-to-one correspondence with the direction of the head of the user. For example, when the head of the user is in a posture facing forward and downward, the posture judgment unit 114 generates posture information indicating the "posture inclining downward" (hereinafter referred to simply as "downward").

A change in the posture of the head-mounted display 10 may occur due to a change in the direction of the body of the user as a whole or due to a movement of a head of the user. The determination as to whether the change in the posture is due to the movement of the head or the whole body is made based on the magnitude of the acceleration detected by the acceleration sensor 105. More specifically, when the magnitude of the acceleration detected by the acceleration sensor 105 is larger than a particular value, it is determined that the change in the posture is due to the movement of the head. In view of the above, the posture judgment unit 114 may generate the posture information only when it is determined that a change in the posture due to a movement of the head of the user is detected by the detection unit 111, because the change in the posture caused by the movement of the head of the user is more likely to be due to an intentional change in the posture of the head of the user.

Note that the posture judgment unit 114 may judge the posture of the head-mounted display 10 by respectively detecting a front direction and a predetermined direction. Herein the predetermined direction is a direction different from the front direction. For example, the predetermined direction may be a downward direction. In the present embodiment, the posture judgment unit 114 determines the posture of the head-mounted display 10 such that when a user faces in the front direction, the head-mounted display 10 is determined to be in a first posture, while when the user faces in the predetermined direction, the head-mounted display 10 is determined to be in a second posture.

In a case where the inclination of the head-mounted display 10 indicated by the received information indicating the inclination is within a first range of an angle, the posture judgment unit 114 determines that the posture of the head-mounted display 10 is the first posture. In a case where the inclination of the head-mounted display 10 indicated by the received information indicating the inclination is within a second range of an angle different from the first range, the posture judgment unit 114 determines that the posture of the head-mounted display 10 is the second posture. In the present embodiment, the posture is defined by a range of an angle about the Y-axis. The posture may be defined by a range of an angle about one axis, or by ranges of angles about two axes, or by ranges of angles about three axes.

In a case where the posture of the head-mounted display 10 is the first posture, the display controller 115 of the control unit 112 controls the display device 113 to display the first image representing an operation process performed by a user. In a case where the posture judgment unit 114 determines that the posture of the head-mounted display 10 has changed from the first posture to the second posture, the display controller 115 switches the image displayed on the display device 113 from the first image to the second image whose display area on the display device 113 is smaller than that of the first image. That is, the second image is an image that is smaller in size of the display area displayed on the display device 113 than that of the first image. Alternatively, the second image may be an image having smaller amount of information displayed on the display device 113 than that of the first image. Herein, the amount of information may be defined by the size of the display area in which the information is displayed on the display device 113 or by the number of characters or the like displayed on the display device 113.

The display device 113 is a display apparatus that displays information in the form of an image. More specifically, the display device 113 displays display information output by the control unit 112 in the form of an image. The display device 113 is realized with the display 106 or the like.

Functions and processes associated with respective functional blocks of the head-mounted display 10 are described in detail below. First, detecting the posture of the head-mounted display 10 by the posture judgment unit 114 is described below.

Figure 4:
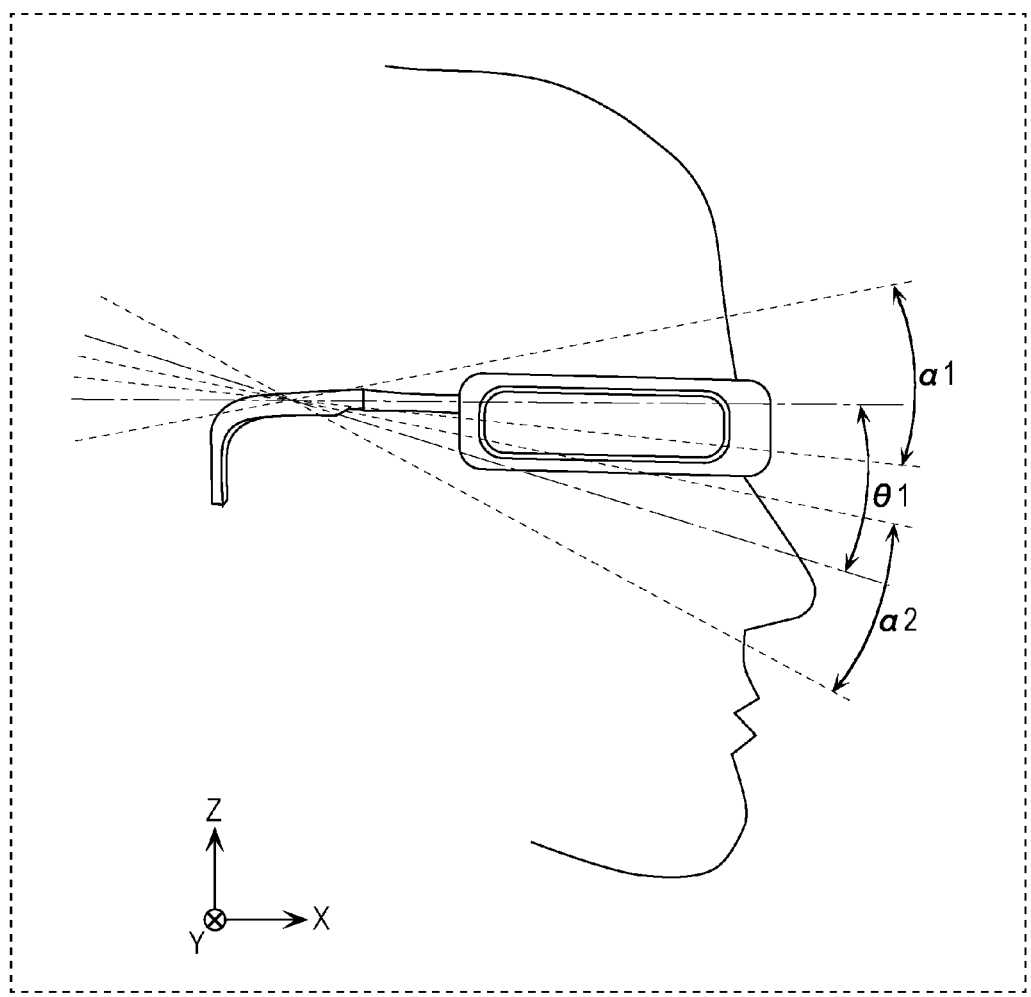
FIG. 4 is a first diagram illustrating judgment of the posture by posture judgment unit according to the first embodiment.

FIG. 4 is a first diagram illustrating judgment of the posture by posture judgment unit according to the first embodiment. In the example shown in FIG. 4, a change in the posture of the head-mounted display 10 is detected for a case where a user moves his/her head vertically up or down (in an X-Z plane).

More specifically, in FIG. 4, it is assumed that the user moves his/her head within a range of an angle of $\theta1$ degrees with reference to the front direction of the user. In this situation, based on the inclination of the head-mounted display 10 detected by the inclination detection unit 111, the posture judgment unit 114 detects a change in the posture of the head-mounted display 10 when the posture moves down by $\theta1$ from a reference posture of the head-mounted display 10. More specifically, in a case where the inclination of the head-mounted display 10 detected by the inclination detection unit 111 is within a range of an angle $\alpha1$ (within a first range) with respect to the front direction (for example, an exact front direction) of the user, the posture judgment unit 114 determines that the posture of the head-mounted display 10 is the first posture. In a case where the inclination of the head-mounted display 10 detected by the inclination detection unit 111 is within a range of an angle $\alpha2$ (within a second range) with respect to a direction rotated by an angle of $\theta1$ from the front direction of the user, the posture judgment unit 114 determines that the posture of the head-mounted display 10 is the second posture. Note that the range of angle $\alpha1$ and the range of angle $\alpha2$ do not overlap.

Specific examples of images displayed on the display device 113 are described below. The images displayed are those representing an operation process as described above. In the present embodiment, it is assumed by way of example that a cooking process is represented by the image.

Figure 5:
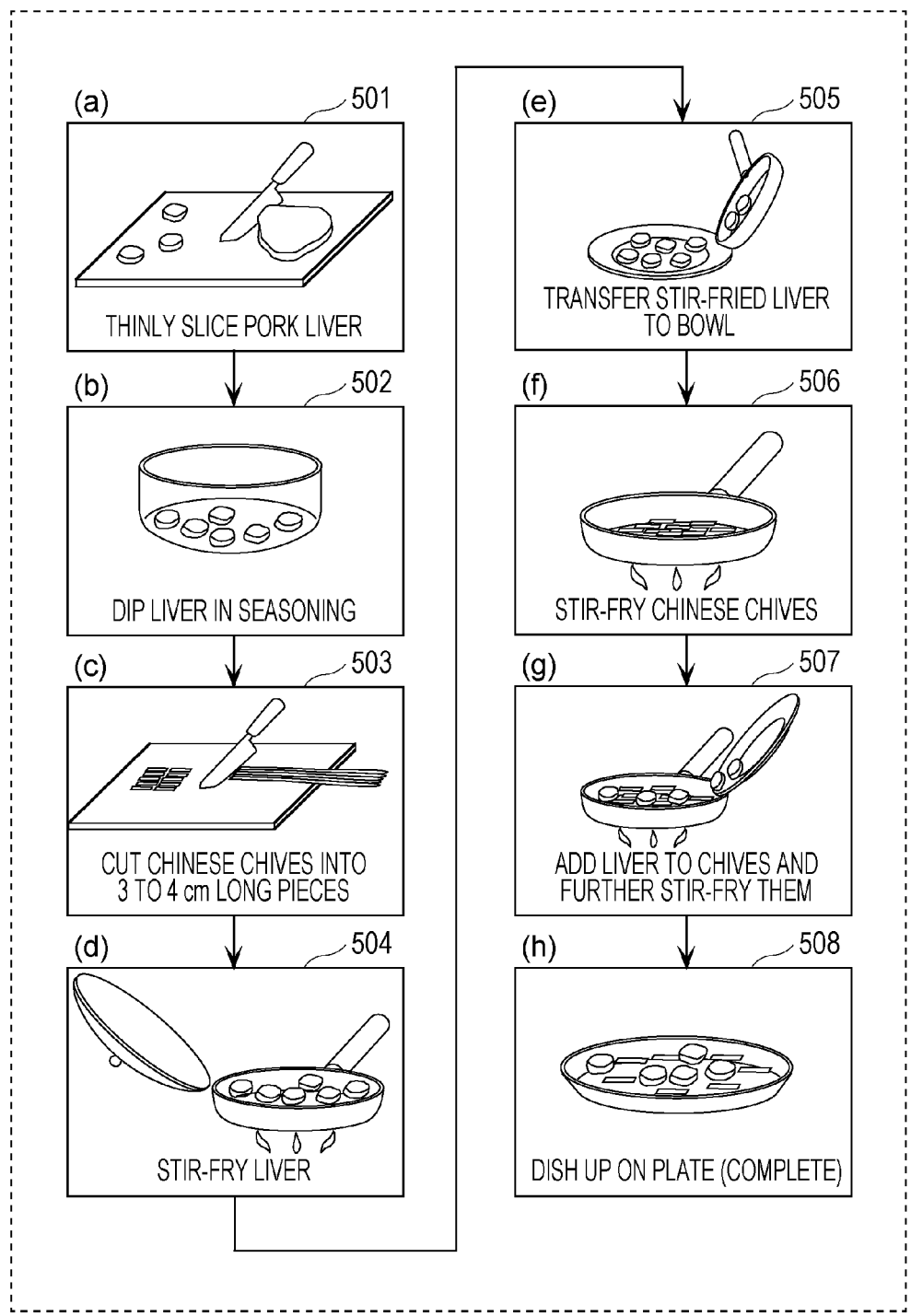
FIG. 5 is a diagram illustrating a cooking process as an example of an operation process according to the first embodiment.

FIG. 5 is a diagram illustrating a cooking process as an example of an operation process according to the first embodiment. In the example shown in FIG. 5, a cooking process of "stir-fried liver and Chinese chives" is represented. That is, images shown in FIGS. 5(*a*) to 5(*h*) are displayed on the display device 113. Note that the "stir-fried liver and Chinese chives" is a dish made by stir-frying liver and Chinese chives.

More specifically, FIG. 5(*a*) shows an image 501 representing a cooking operation of thinly slicing pork liver. FIG. 5(*b*) shows an image 502 representing a cooking operation of dipping the thinly sliced liver in a seasoning. FIG. 5(*c*) shows an image 503 representing a cooking operation of cutting Chinese chives into 3 to 4 cm long pieces. FIG. 5(*d*) shows an image 504 representing a cooking operation of stir-frying liver subjected to dipping in the seasoning. FIG. 5(*e*) shows an image 505 representing a cooking operation of transferring the stir-fried liver to a bowl. FIG. 5(*f*) shows an image 506 representing a cooking operation of stir-frying the cut Chinese chives. FIG. 5(*g*) shows an image 507 representing a cooking operation of adding liver to the Chinese chives and further stir-frying them. FIG. 5(*h*) shows an image 508 representing a cooking operation of dishing up complete stir-fried liver and Chinese chives on a plate.

In the head-mounted display 10 according to the present embodiment, as described above, images representing cooking operations as operation operations are sequentially displayed on the display 106 in the order from FIG. 5(*a*) to FIG. 5(*h*) by executing a particular application. The images 501 to 508 may be, for example, images stored in the storage 103, images acquired from the outside via the communication IF 104, or images generated by the control unit 112 from the images stored in the storage 103 or the image acquired from the outside.

Figure 6:
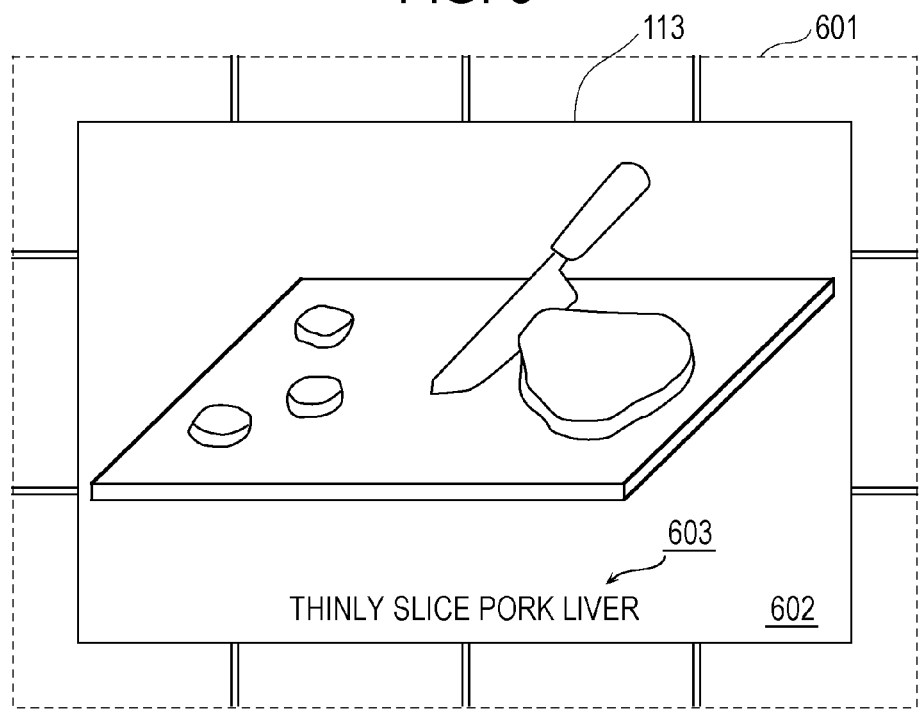
FIG. 6 is a diagram illustrating an example of a field of view of a user and an image (first image) displayed on a display device according to the first embodiment.

FIG. 6 is a diagram illustrating an example of a field of view of a user and an image (first image) displayed on the display device according to the first embodiment.

A field of view 601 of a user represents a field of view seen by the user wearing the head-mounted display 10. The field of view 601 of the user includes a reality environment seen with user's eyes and also includes the display device 113 such that the display device 113 is superimposed on the reality environment. In other words, the user sees the reality environment transparently seen through the display device 113.

In FIG. 6, the image 602 is displayed over the entire display area of the display device 113. In a case where the posture of the head-mounted display 10 is the first posture, the image 602 is the first image displayed on the display device 113, and the image 602 shown in FIG. 6 is an example of the first image representing an operation process performed by a user. As for the image 602 displayed here, the image 501 shown in FIG. 5(a) is used. The image 602 may include a descriptive text 603 describing the content of the operation process as shown in FIG. 6. Note that the image 602 does not necessarily need to be displayed over the entire display area of the display device 113, but the image 602 may be displayed in a smaller area between an object to be processed in the reality environment in the field of view of the user and an eye of the user. For example, the image 602 may be displayed in a display area with a size equal to or larger than 50% of that of the entire display area.

Figure 7:
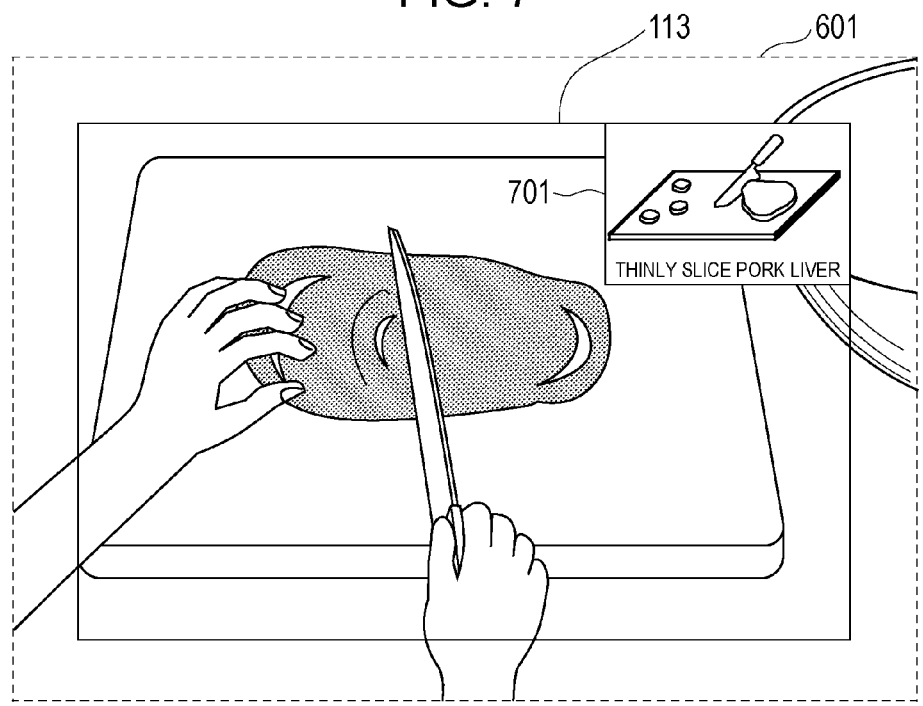
FIG. 7 is a diagram illustrating an example of a field of view of a user and an image (second image) displayed on a display device according to the first embodiment.

FIG. 7 is a diagram illustrating a field of view of a user and an image (second image) displayed on the display device according to the first embodiment.

An image 701 is an example of the second image displayed, under the control of the control unit 112, on the display device 113 depending on a change in the posture of the head-mounted display 10. That is, the image 701 is an example of the second image that has a display area smaller than that of the first image and that is displayed on the display device 113 when the posture judgment unit 114 determines that the posture of the head-mounted display 10 has changed from the first posture to the second posture. In the present embodiment, the second image is an image obtained by reducing the first image. The image 701 is displayed at a location (in an upper right corner in the first embodiment) in the display area of the display device 113 such that the image 701 does not obstruct user's field of vision as much as possible.

1-2. Operation

An operation of the head-mounted display 10 configured in the above-described manner is described below with reference to FIG. 8, FIG. 9A and FIG. 9B.

Figure 8:
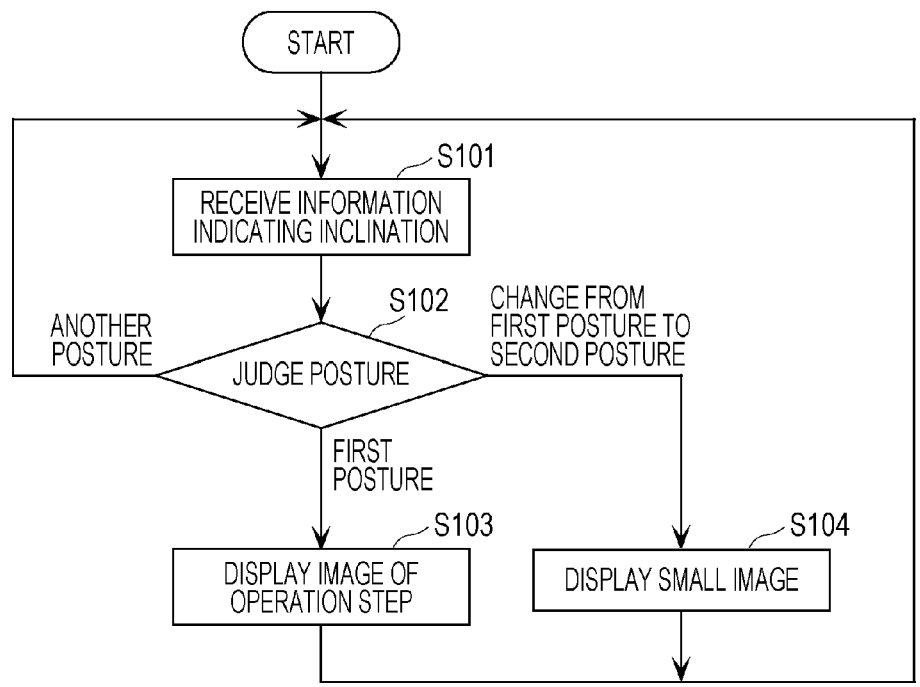
FIG. 8 is a flow chart illustrating an example of an operation of a head-mounted display according to the first embodiment.
Figure 9A:
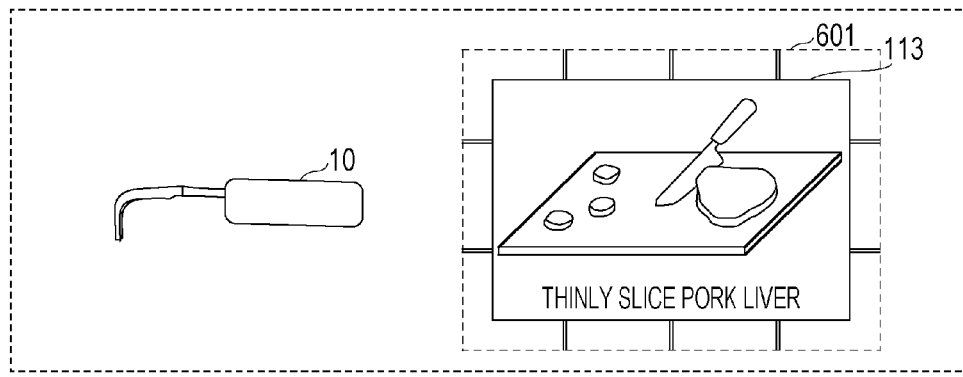
FIG. 9A is a diagram illustrating a relationship between a posture of a head-mounted display and an image displayed under the control of a control unit by a display control method according to the first embodiment.
Figure 9B:
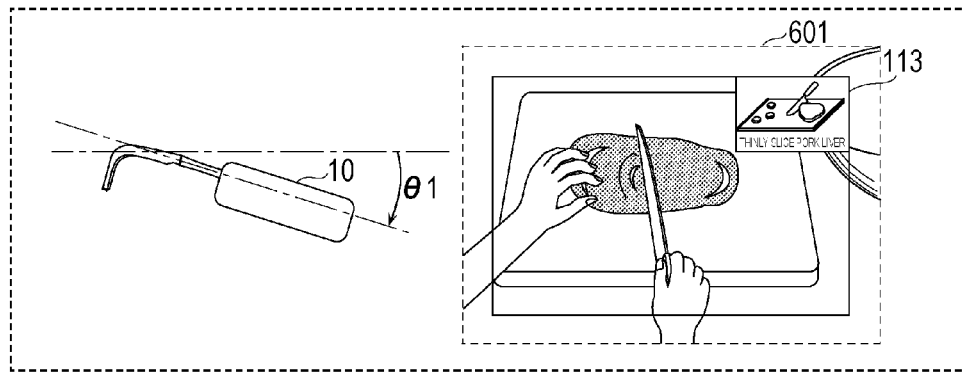
FIG. 9B is a diagram illustrating a relationship between a posture of a head-mounted display and an image displayed under the control of a control unit by a display control method according to the first embodiment.

FIG. 8 is a flow chart illustrating an example of an operation of a head-mounted display according to the first embodiment. Each of FIG. 9A and FIG. 9B is a diagram illustrating a relationship between a posture of a head-mounted display and an image displayed under the control of a control unit by a display control method according to the first embodiment.

First, the control unit 112 receives information indicating an inclination detected by the inclination detection unit 111 (S101).

Next, the posture judgment unit 114 of the control unit 112 determines the posture of the head-mounted display 10 based on the received information indicating the inclination (S102). More specifically, based on the received information indicating the inclination, the posture judgment unit 114 determines whether the head-mounted display 10 is in the first posture or the posture thereof has changed from the first posture to the second posture, or the head-mounted display 10 is in a posture other than the first and the second posture. The posture judgment unit 114 sends a result of the determination to the display controller 115.

Next, in a case where the posture judgment unit 114 determines that the posture of the head-mounted display 10 is the first posture (that is, in a case where it is determined in S102 that the posture is the "first posture"), the display controller 115 of the control unit 112 controls the display device 113 to display the first image representing an operation process performed by the user (S103). Step S103 corresponds to the state shown in FIG. 9A.

On the other hand, in a case where the posture judgment unit 114 determines that the posture of the head-mounted display 10 has changed from the first posture to the second posture (that is, in a case where it is determined in S102 that the posture has changed from "first posture to second posture"), the display controller 115 switches the image displayed on the display device 113 from the first image to the second image whose display area on the display device 113 is smaller than that of the first image (S104). Note that in the switching to the second image in step S103, the first image is switched to the second image which is a simple image representing in a simplified fashion the operation process represented in the first image. Step S104 corresponds to the state shown in FIG. 9B. More specifically, the first image representing the operation process may be simplified by deleting a part of information (image, text, or the like) included in the first image, or by simplifying part of information included in the first image, or the like.

Thus, when the head of the user is in a posture facing down (the second posture) in performing cooking, the image with a size reduced so as not to interfere with the user's cooking operation is displayed on the display device 113.

In a case where it is determined in step 3102 that the posture is another posture, or in a case where step 3103 is completed, or in a case where step 3104 is completed, the processing flow returns to step 3101. That is, in the control unit 112 of the head-mounted display 10, the process from step S101 to step 3104 is repeated periodically. That is, in a case where the posture judgment unit 114 determines in step 3102, after step 3104, that the posture of the head-mounted display 10 has changed from the first posture to the second posture, (that is, in a case where it is determined that the posture has changed from the second posture to the first posture), the image displayed on the display device 113 is changed from the second image to the first image.

1-3. Effects, Etc.

According to the display control method of the present embodiment, as described above, in a case where the head-mounted display 10 is in the first posture, an image representing an operation process performed by the user is displayed on the display device 113, while in a case where it is determined that the posture of the head-mounted display 10 has changed from the first posture to the second posture, the image displayed on the display device 113 is switched to the second image having the display area smaller than that of the first image. That is, based on the posture of the head-mounted display 10 that changes together with the change in the direction of the face of the user, displaying is controlled, for example, as to whether an operation process is displayed over the entire area of the display device 113 of the head-mounted display 10 or in a part of the display device 113 of the head-mounted display 10. Thus, in a case where the user performs an operation at hand, it is allowed to change the image displayed on the display device 113 simply by changing the direction of the face while maintaining the state of the hands. For example, it is allowed to switch between a state in which a large image representing an operation process is displayed to allow a user to understand the details of the operation process and a state in which a small or simplified image representing the operation process is displayed not to interfere with the operation of the user without the user to have to stop the operation and move his/her hand off, for example, to manually turn on/off an input device such as a button or the like provided on the device to switch the image displayed on the display device.

In the display control method according to the present embodiment, in the switching to the second image, the first image is switched to the second image which is a simple image representing in a simplified fashion the operation process represented in the first image. That is, even in the situation in which the image displayed on the display device 113 is switched to the second image having the display area smaller than that of the first image, the operation process represented in the first image is represented in a simplified fashion in the second image, and thus the user is allowed to understand the operation process, which was previously represented in the first image, by watching the second image.

Furthermore, in the display control method according to the present embodiment, the operation executed by the processor of the head-mounted display 10 further includes in a case where it is determined that after the image displayed on the display device 113 is changed from the first to the second image, the posture of the head-mounted display 10 is changed from the first posture to the second posture, the image displayed on the display device 113 is switched from the second image to the first image. Thus, the user is allowed to again see the details of the operation process being in progress simply by returning the posture of the head-mounted display 10 to the first posture.

Second Embodiment

Next, a second embodiment is described below.
2-1. Operation

A display control method according to the second embodiment is different from the display control method according to the first embodiment in terms of the process of step S104 and following steps. Note that also in the display control method according to the second embodiment, the head-mounted display 10 used is the same as that used in the first embodiment.

Referring to FIGS. 10 to 13, a description is given below as to an operation of the head-mounted display 10 according to the display control method of the second embodiment.

Figure 10:
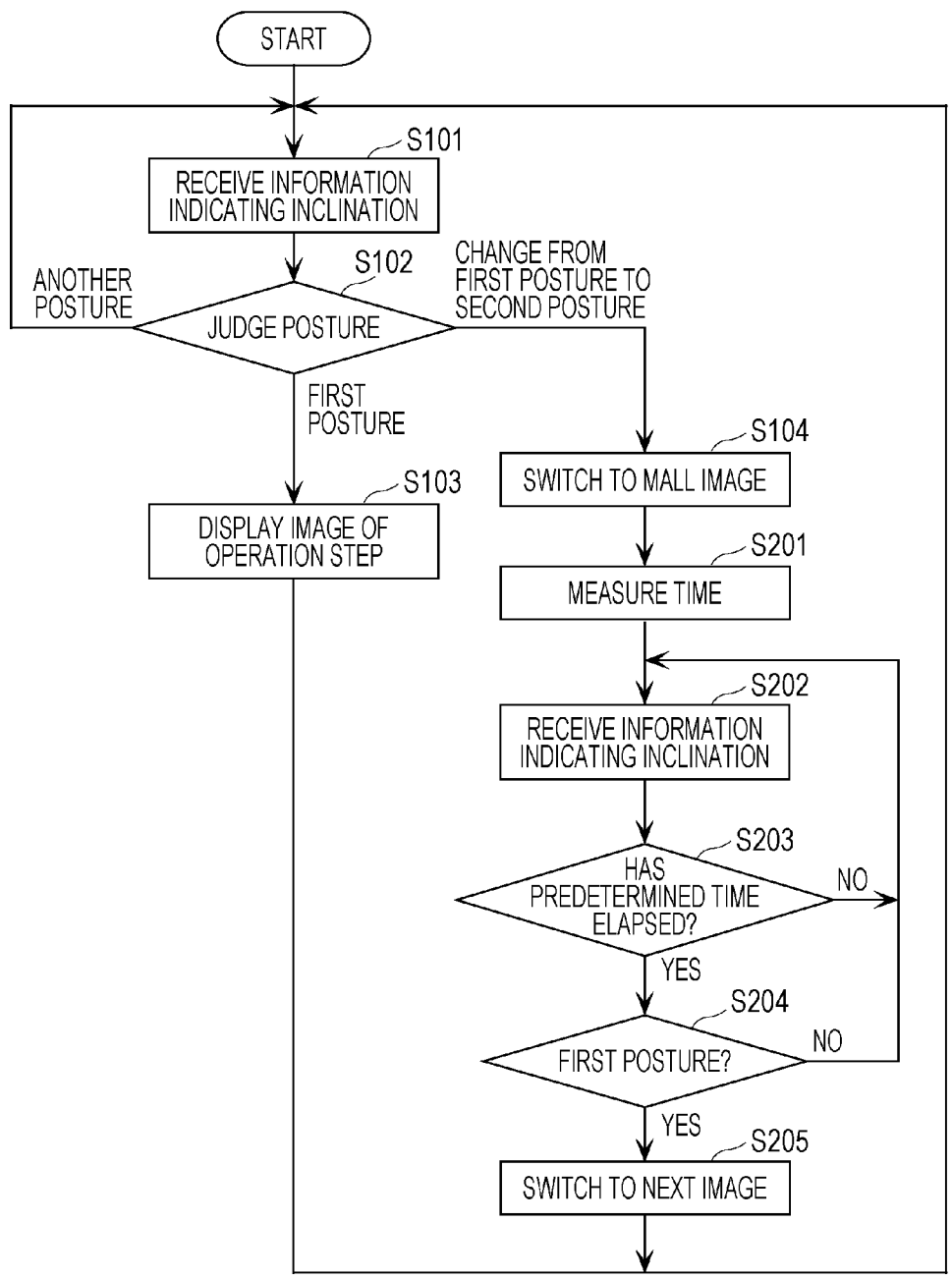
FIG. 10 is a flow chart illustrating an example of an operation of a head-mounted display according to the second embodiment.
Figure 11:
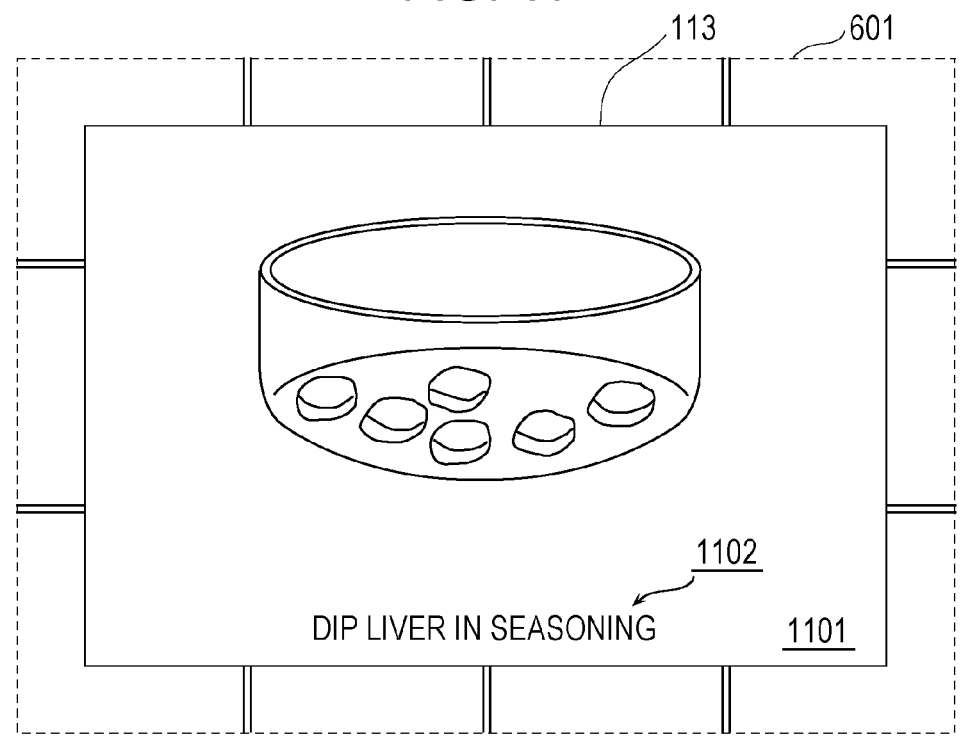
FIG. 11 is a diagram illustrating an example of a field of view of a user and an image (third image) of a next operation process displayed on a display device according to the second embodiment.
Figure 12:
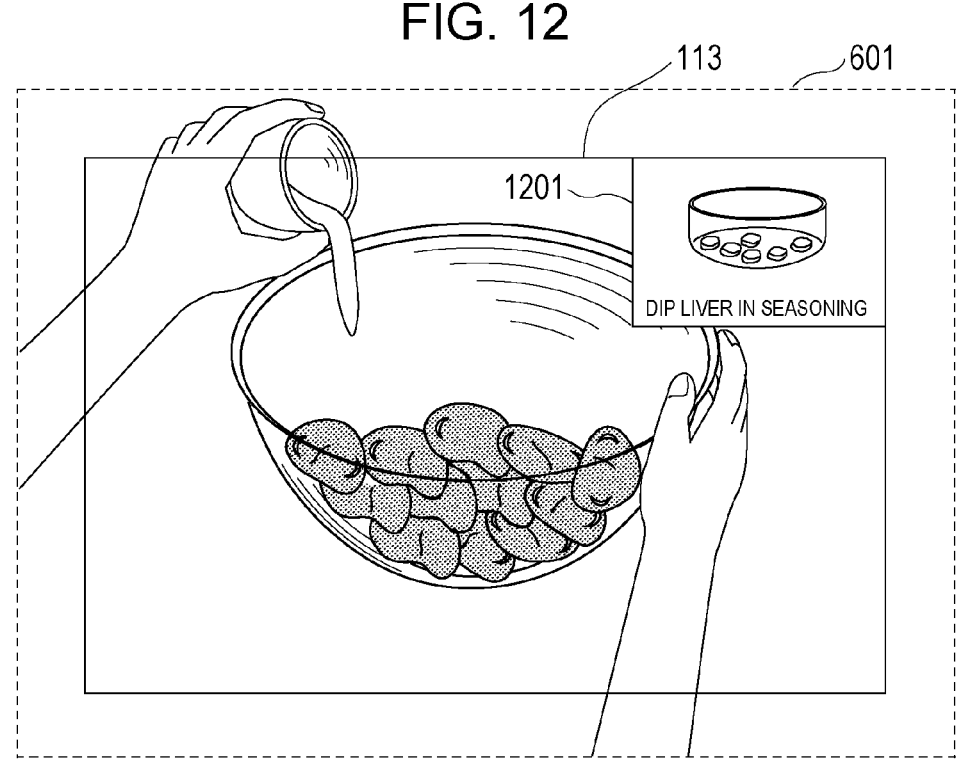
FIG. 12 is a diagram illustrating an example of a field of view of a user and an image (second image) of a next operation process displayed on a display device according to the second embodiment.
Figure 13A:
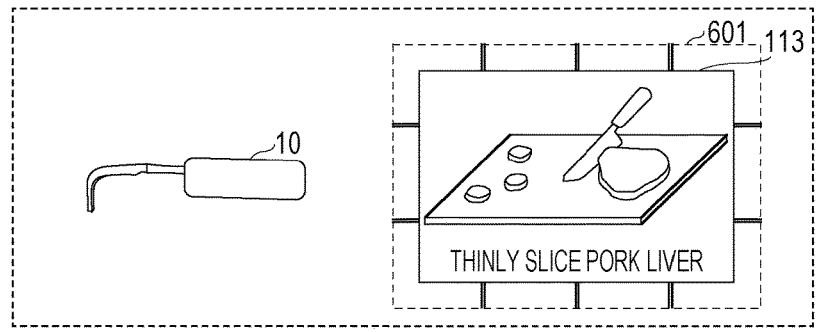
FIG. 13A is a diagram illustrating a relationship between a posture of a head-mounted display and an image displayed under the control of a control unit by a display control method according to the second embodiment.
Figure 13B:
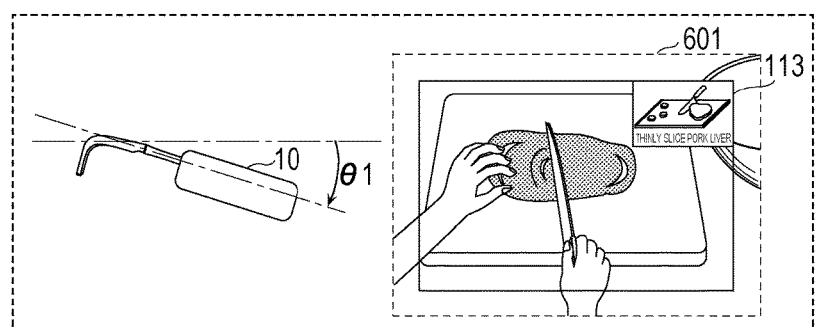
FIG. 13B is a diagram illustrating a relationship between a posture of a head-mounted display and an image displayed under the control of a control unit by a display control method according to the second embodiment.
Figure 13C:
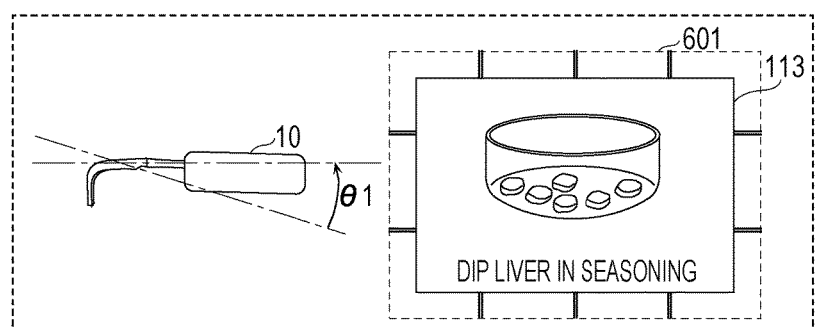
FIG. 13C is a diagram illustrating a relationship between a posture of a head-mounted display and an image displayed under the control of a control unit by a display control method according to the second embodiment.
Figure 13D:
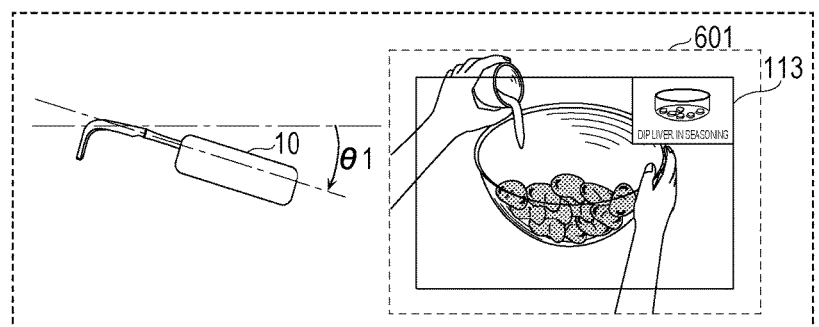
FIG. 13D is a diagram illustrating a relationship between a posture of a head-mounted display and an image displayed under the control of a control unit by a display control method according to the second embodiment.

FIG. 10 is a flow chart illustrating an example of an operation of a head-mounted display according to the second embodiment. FIG. 11 is a diagram illustrating a field of view of a user and an image (third image) of a next operation process displayed on a display device according to the second embodiment. FIG. 12 is a diagram illustrating a field of view of a user and an image (second image) of a next operation process displayed on a display device according to the second embodiment. Each of FIGS. 13A, 13B, 13C and 13D is a diagram illustrating a relationship between a posture of a head-mounted display and an image displayed under the control of a control unit by a display control method according to the second embodiment.

First, a process in steps S101 to S104 is performed. The process in steps S101 to S104 is similar to that according to the first embodiment, and thus a description thereof is omitted here. In the process in steps S101 to S104, step S103 corresponds to the state shown in FIG. 13A, and step S104 corresponds to the state shown in FIG. 13B.

When step S104 is completed, the control unit 112 measures time elapsed from the occurrence of the change in the posture of the head-mounted display 10 from the first posture to the second posture (S201).

Next, the control unit 112 receives information indicating an inclination detected by the inclination detection unit 111 (S202).

The control unit 112 then determines whether the elapsed time measured has reached a predetermined value (S203).

In a case where the determination by the control unit 112 is that the elapsed time measured has reached the predetermined value (Yes in S203), the posture judgment unit 114 then determines whether the head-mounted display 10 is in the first posture (S204).

In a case where the determination by the posture judgment unit 114 is that the head-mounted display 10 is in the first posture (in a case where it is determined that the posture of the head-mounted display 10 has changed from the second posture to the first posture) (Yes in S204), the display controller 115 switches the information displayed on the display device 113 from the second image to a third image (S205). Step 3205 corresponds to the state shown in FIG. 13C.

The third image is an image representing an operation process next to the operation process represented in the first image. In FIG. 11, as in FIG. 6, an image 1101 is displayed over the entire display area of the display device 113. The image 1101 is an example of the third image displayed on the display device 113 to represent an operation process performed by a user. More specifically, as for the image 1101 displayed here, an image 502 representing an operation process next to the image 501 shown in FIG. 5(a) is used. The image 1101 may include a descriptive text 1102 describing the content of the operation in the operation process as shown in FIG. 11.

In a case where the control unit 112 determines that the elapsed time measured has not yet reached the predetermined value (No in S203), or in a case where the posture judgment unit 114 determines that the head-mounted display 10 is not in the first posture (No in S204), the processing flow returns to step S202.

In a case where it is determined in step S102 that the head-mounted display 10 is in another posture, in a case where step S103 is completed, or in a case where step S205 is completed, the processing flow returns to step S101. That is, as in the first embodiment, the control unit 112 of the head-mounted display 10 periodically repeats the process from step S101 to step S104 and the process from step S201 to step S205. That is, in a case where it is determined in step S102, after step S205, that the posture of the head-mounted display 10 has changed from the first posture to the second posture, the image displayed on the display device 113 is switched from the first image (image 1101) corresponding to the current operation process to the second image. The switching from the first image to the second image corresponds to a state shown in FIG. 13D.

Note that the second image, to which the first image is changed in this situation, is displayed, for example, as follows. For example, as illustrated in FIG. 12, in the situation in which the user is performing the next operation while holding the head-mounted display in the second posture, an image 1201, which is an image obtained by reducing the image 1101, is displayed in an upper right corner of the display device 113 to present the image 1201 to the user which is performing the next operation, that is, the operation of "dipping liver in seasoning".

2-2 Effects, Etc.

In the display control method according to the present embodiment, as described above, the elapsed time is measured starting from the occurrence of the change in the posture of the head-mounted display 10 from the first posture to the second posture, and in a case where it is determined that the posture of the head-mounted display 10 has changed from the second posture to the first posture after the measured elapsed time has reached a predetermined value of time, the information displayed on the display device 113 is switched from the second image to the third image representing an operation process next to the operation process represented in the first image.

That is, when the posture of the head-mounted display 10 is changed to the second posture, it is determined that the user has started an operation of the current operation process. On the other hand, when the predetermined period of time has elapsed, it is determined that the user has completed the operation of the current operation process. Therefore, when the posture changes to the first posture after the elapse of predetermined period of time from the change to the second posture, the third image representing the next operation process is displayed on the display device 113 to allow the user to watch the third image representing the next operation process without having to manually operate the head-mounted display 10. When the predetermined period of time has not yet elapsed, even if the posture of the head-mounted display 10 is changed to the first posture, the first image is continuously displayed without being changed to the third image representing the next operation process to allow the user to again watch the details of the current operation process.

2-3. Modifications

In the display control method according to the second embodiment described above, it is determined in step S203 whether the elapsed time measured in step S201 has reached the predetermined value of time. Note that in the determination of whether the predetermined period of time has elapsed, the predetermined period of time may be different depending on the content represented in the first image. The processing time of the operation process may vary depending on which one of operation processes is performed. Therefore, in a case where the processing time of the operation process varies depending on which one of operation processes is performed, the predetermined period of time may be set differently depending on the processing time of each operation process such that changing to the image representing to the next operation process is performed at a correct timing.

Third Embodiment

Next, a third embodiment is described below.

3-1. Operation

The display control method according to the third embodiment is different in the display control method according to the first embodiment or the second embodiment in that an additional display control method described below is further executed in parallel. Note that also in the display control method according to the third embodiment, the head-mounted display 10 used is the same as that used in the first embodiment.

Figure 14:
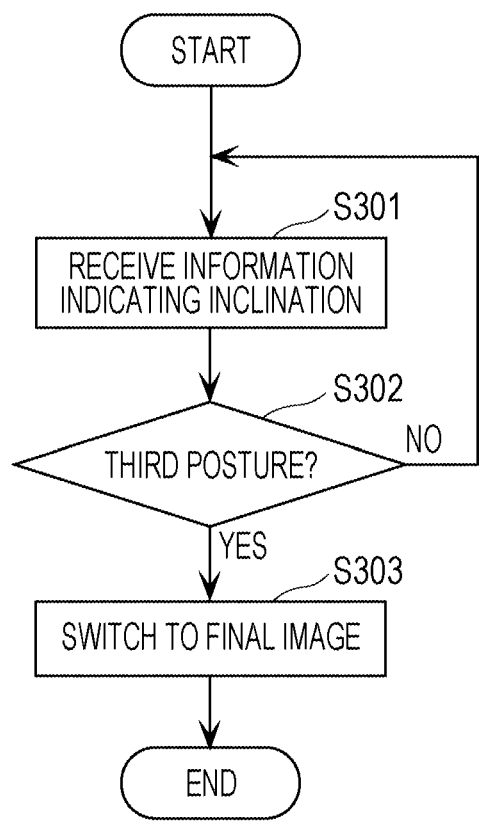
FIG. 14 is a flow chart illustrating an example of an operation of a head-mounted display according to a third embodiment.
Figure 15:
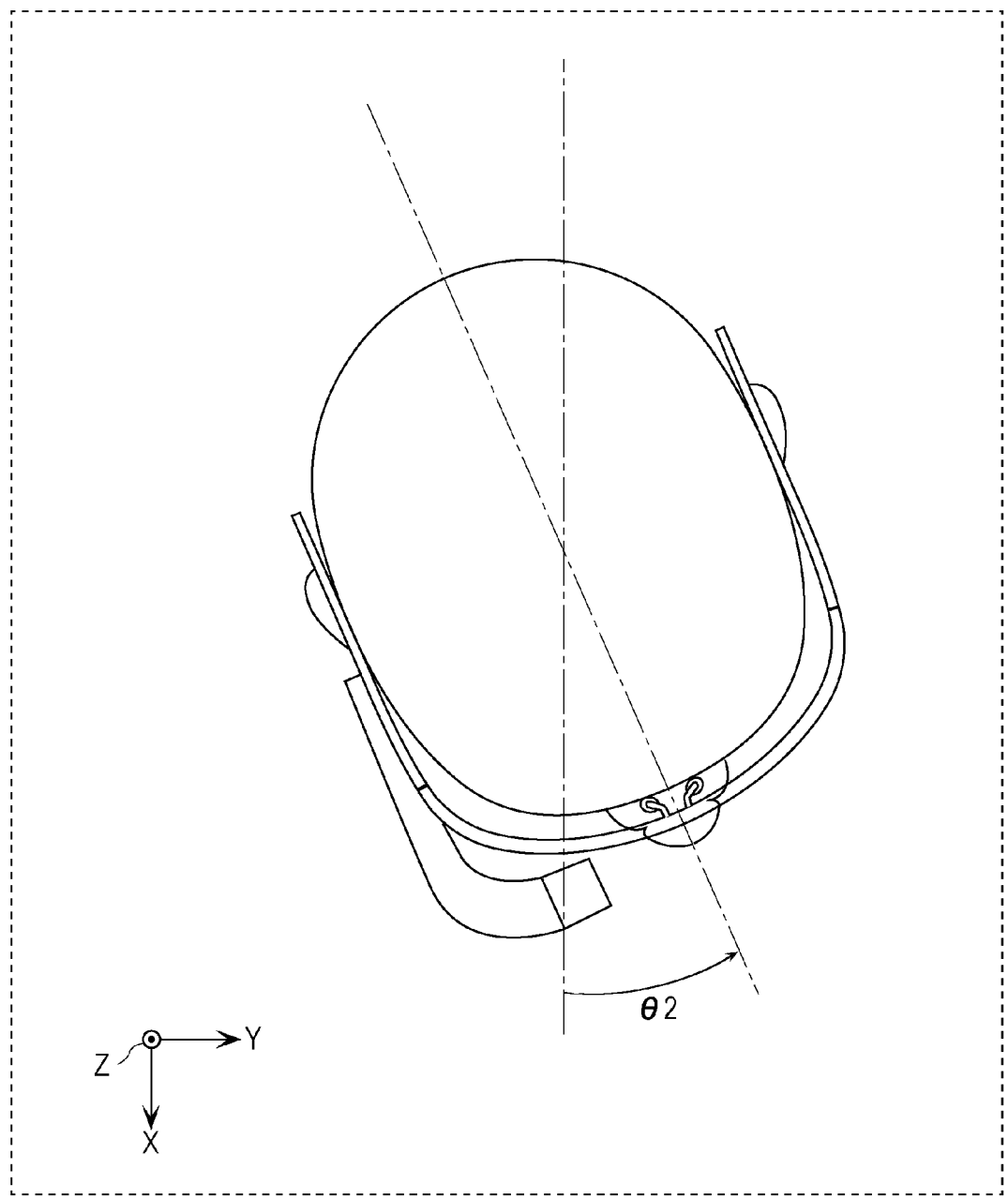
FIG. 15 is a second diagram illustrating a detection of a posture by an inclination detection unit according to the third embodiment.
Figure 16:
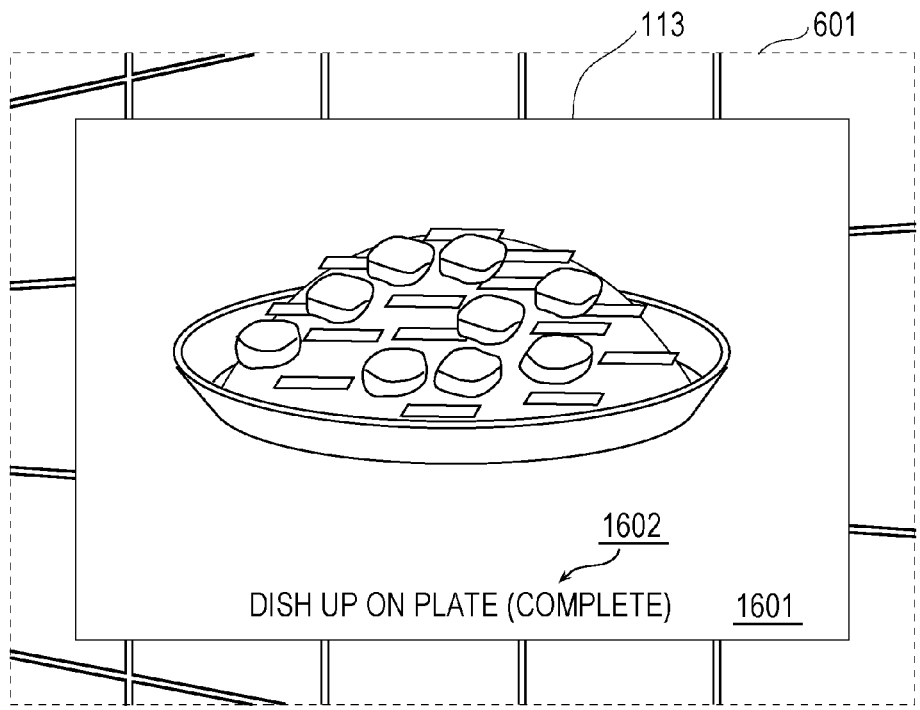
FIG. 16 is a diagram illustrating an example of a field of view of a user and a fourth image representing a complete state of an operation process displayed on a display device according to the third embodiment.

Referring to FIGS. 14 to 16, a description is given below as to an operation of the head-mounted display 10 according to the display control method of the third embodiment.

FIG. 14 is a flow chart illustrating an example of an operation of a head-mounted display according to a third embodiment. FIG. 15 is a second diagram illustrating a detection of a posture by an inclination detection unit according to the third embodiment. FIG. 16 is a diagram illustrating an example of a field of view of a user and a fourth image representing a complete state of an operation process displayed on a display device according to the third embodiment.

First, the control unit 112 receives information indicating an inclination detected by the inclination detection unit 111 (S301).

Next, the posture judgment unit 114 of the control unit 112 determines whether the head-mounted display 10 is in a third posture (3302). Here the third posture is, as illustrated in FIG. 15, a posture of the head-mounted display 10 that is achieved when a head of a user is turned horizontally (to left or right) in a horizontal plane (X-Y plane).

More specifically, in the example of the third posture shown in FIG. 15, the head of the user is turned to the left by an angle of θ2 (degrees) from the front direction given as the reference direction. In this state, based on the inclination of the head-mounted display 10 detected by the inclination detection unit 111, the posture judgment unit 114 detects that the head-mounted display 10 is in the posture to which it has reached after turning to the left by θ2 degrees from the reference posture. Note that the reference posture is a posture with which a change in the posture starts. In the reference posture, the head of the user is supposed to be substantially at rest. Also in this case, as in the case shown in FIG. 4, the determination as to whether the third posture is taken or not is performed based on whether the posture is within a particular range of an angle. This is performed in a similar manner to that shown in FIG. 4, and thus a further detailed description is omitted.

In a case where the determination by the posture judgment unit 114 is that the head-mounted display 10 is in the third posture (Yes in S302), the display controller 115 changes the image displayed on the display device 113 to a fourth image (that is, an image 508) (S303).

The fourth image is an image (a complete image) representing a complete state of the operation process represented in the first image. In FIG. 16, as in FIG. 6 and FIG. 11, an image 1601 is displayed over the entire display area of the display device 113. The image 1601 is an example of the fourth image displayed on the display device 113 to represent a complete state of an operation process performed by a user. More specifically, as for the image 1601 displayed here, an image 508 representing a complete state of the image 501 shown in FIG. 5(*a*) is used. The image 1601 may include a descriptive text 1602 describing the content of the operation of the operation process as shown in FIG. 16.

3-2 Effects, Etc.

In the display control method according to the present embodiment, as described above, in a case where it is determined that the posture of the head-mounted display 10 has changed to the first posture from the first posture or the second posture, the image displayed on the display device 113 is switched to the fourth image representing the complete state of the operation process represented in the first image. This makes it possible for a user to easily see the fourth image representing the complete state of the operation process without the user having to manually operate the head-mounted display 10.

3-3. Modifications

In the display control method according to the third embodiment described above, in a case where it is determined that the posture of the head-mounted display 10 has changed to the first posture from the first posture or the second posture, the image 1601 representing the complete state of the operation process is displayed as the fourth image. Alternatively, another image may be displayed. For example, an image representing all operation processes (a)

to (h) as shown in FIG. 5 may be displayed. This makes it possible for a user to easily see the fourth image representing the complete state of the operation process without the user having to manually operate the head-mounted display 10.

Furthermore, in the display control method according to the third embodiment described above, the fourth image is displayed when it is determined that the posture of the head-mounted display 10 has changed to the first posture from the first posture or the second posture. Alternatively, an image representing a previous operation process before the current one may be displayed. This makes it possible for a user to see the image representing the previous operation process without the user having to manually operate the head-mounted display 10.

Other Embodiments

As described above, examples of techniques disclosed in the present application have been described above with reference to specific embodiments. However, the techniques disclosed herein are not limited to those embodiments described above, but it is allowed to make modifications, replacements, additions, removals, or like. For example, components described in the embodiments may be combined to achieve alternative embodiments.

Some examples of such alternative embodiments are described below.

Figure 17:
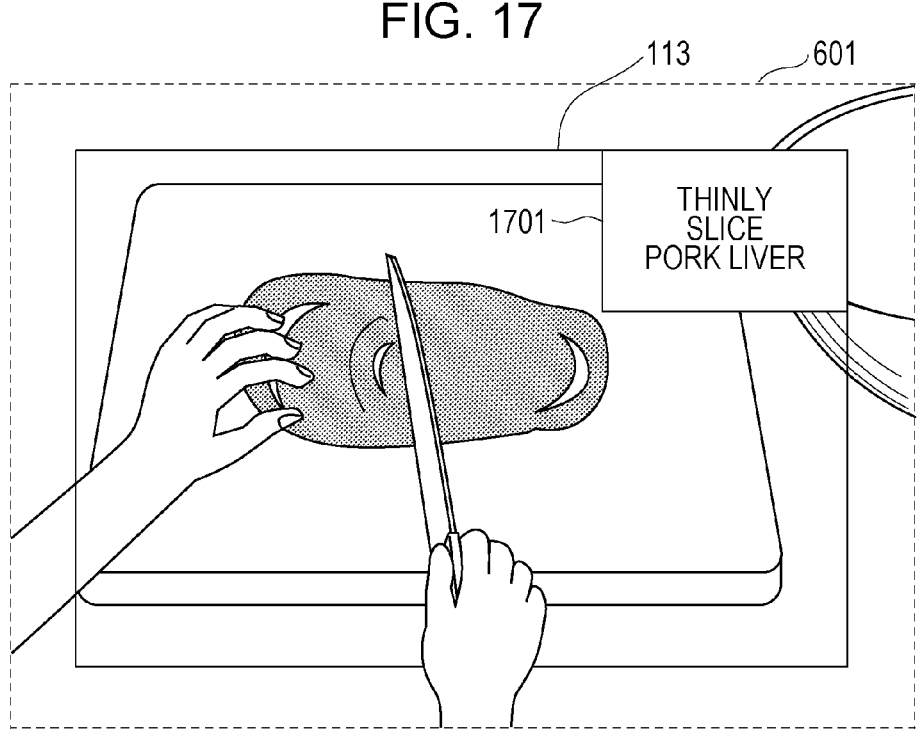
FIG. 17 is a diagram illustrating an example of a field of view of a user and an image (second image) displayed on a display device according to an alternative embodiment.

For example, in the embodiments described above, the first image and the second image each include a text (a descriptive text), and the amount of text displayed in the first image is the same as that of text displayed in the second image. Alternatively, for example, a simple image may be generated so as to represent in a simplified manner the operation process represented in the first image and include a small amount of text obtained by reducing the amount of text included in the first image, and the resultant simple image may be displayed as the second image. In the embodiments described above, the second image includes both an image representing the operation process and a text in the embodiments described above. However, alternatively, the second image may include only a text. For example, as shown in FIG. 17, an image 1701 may be generated so as to include only a reduced amount of descriptive text modified from the descriptive text 603 displayed in the image 602, and the resultant image 1701 may be displayed as the second image on the display device 113. In other words, by reducing the amount of text in the second image with the reduced size, it becomes possible to increase the text size in the second image as much as possible. Note that FIG. 17 is a diagram illustrating a field of view of a user and an image (the second image) displayed on the display device according to an alternative embodiment.

Figure 18:
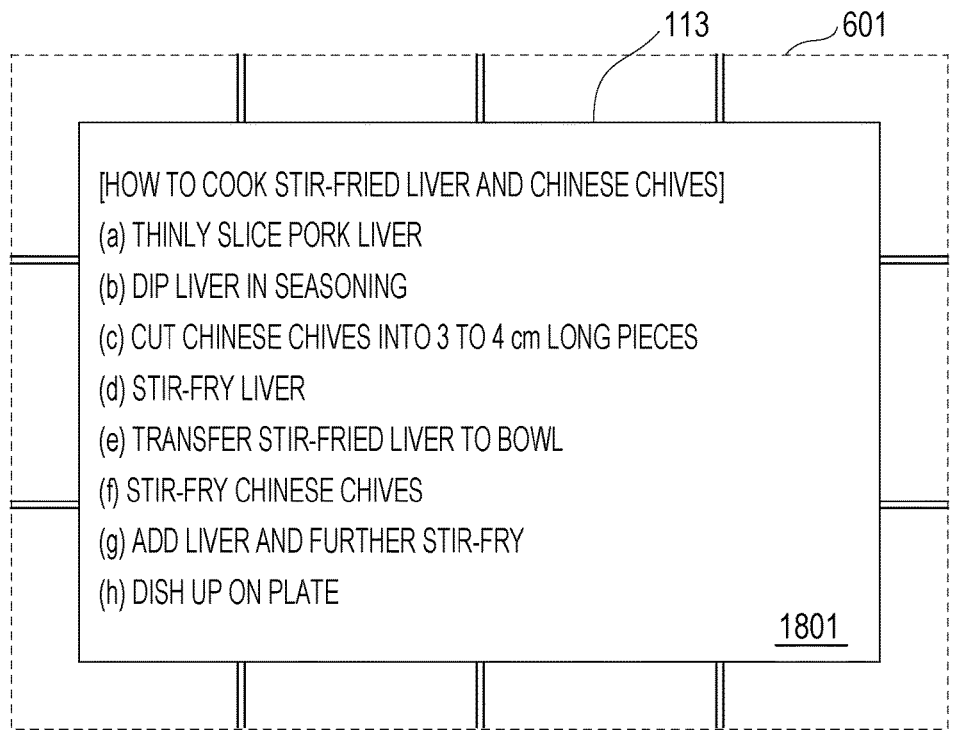
FIG. 18 is a diagram illustrating an example of a field of view of a user and an image (first image) displayed on a display device according to an alternative embodiment.
Figure 19:
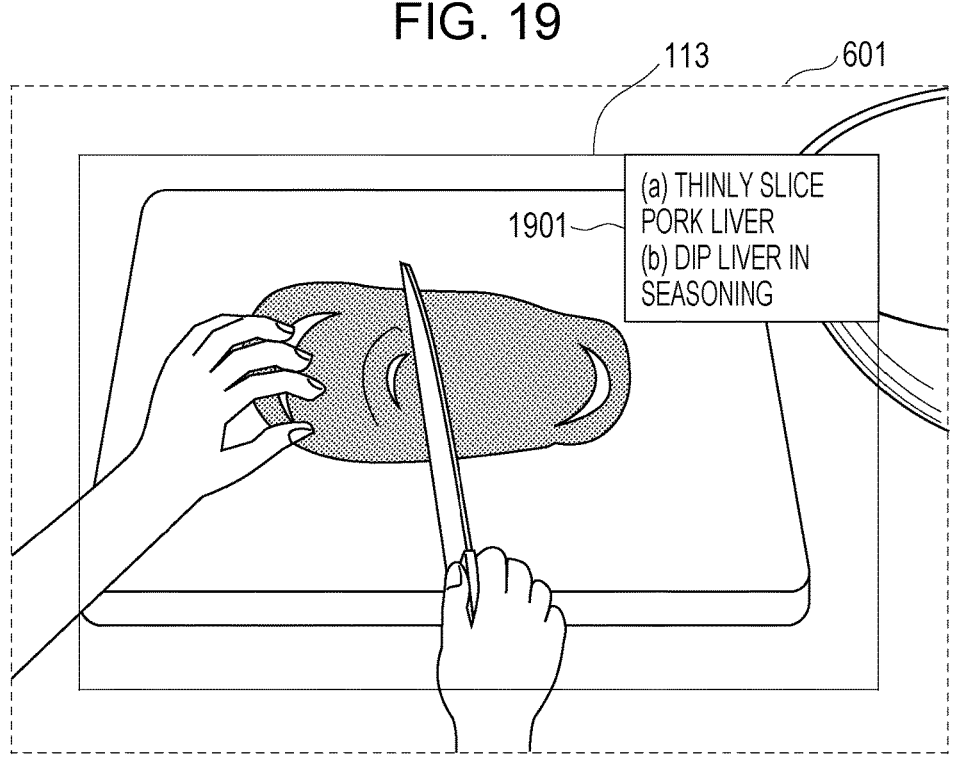
FIG. 19 is a diagram illustrating another example of a field of view of a user and an image (second image) displayed on a display device according to an alternative embodiment.

In the embodiments described above, the first image is an image representing one operation process in the plurality of operation processes. Alternatively, for example, as illustrated in FIG. 18, an image 1801 representing a plurality of operation processes may be displayed as the first image on the display device 113. In this case, in switching to the second image from the first image, as illustrated in FIG. 19, at least one operation process may be deleted from the plurality of operation processes displayed in the first image, and a resultant image 1901 may be used as the second image. In the image 1901, operation processes (c) to (h) are deleted. This makes it possible to display the operation processes in the second image in as large a size as possible on the display device 113. Note that FIG. 18 is a diagram illustrating an example of a field of view of a user and an image (first image) displayed on a display device according to an alternative embodiment, and FIG. 19 is a diagram illustrating another example of a field of view of a user and an image (second image) displayed on a display device according to an alternative embodiment.

Figure 20:
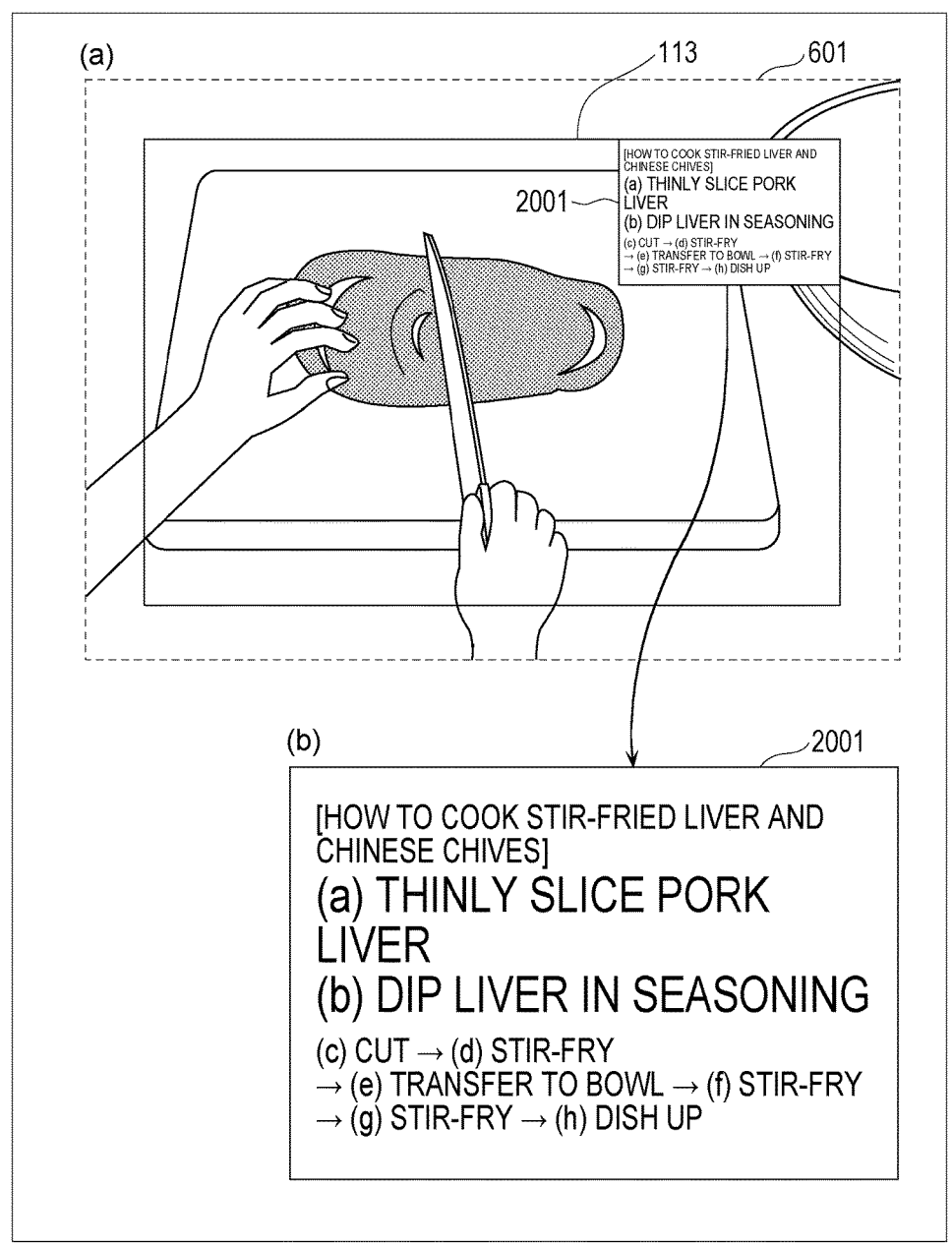
FIG. 20 is a diagram illustrating another example of a field of view of a user and an image (second image) displayed on a display device according to an alternative embodiment.

In a case where the first image includes a plurality of operation processes as with the image 1801 shown in FIG. 18, then, in the switching to the second image from the first image, an image 2001 including a content representing in a simplified manner at least one operation process in the plurality of operation processes may be used as the second image as illustrated in FIG. 20. In the example of the image 2001 shown in FIG. 20, operation processes (c) to (h) are described in a simplified a manner using a reduced amount of text. This makes it possible to display the descriptive text of current operation process (a) and the next operation process (b) in as large a size as possible, while displaying simplified descriptions of other operation processes (c) to (h). This allows the user to see the detailed description of the current operation process as well as a total flow of operation processes. Note that FIG. 20 is a diagram illustrating another example of a field of view of a user and an image (second image) displayed on a display device according to an alternative embodiment. FIG. 20(b) is a diagram illustrating in an enlarged manner the image 2001 shown in FIG. 20(a).

Figure 21:
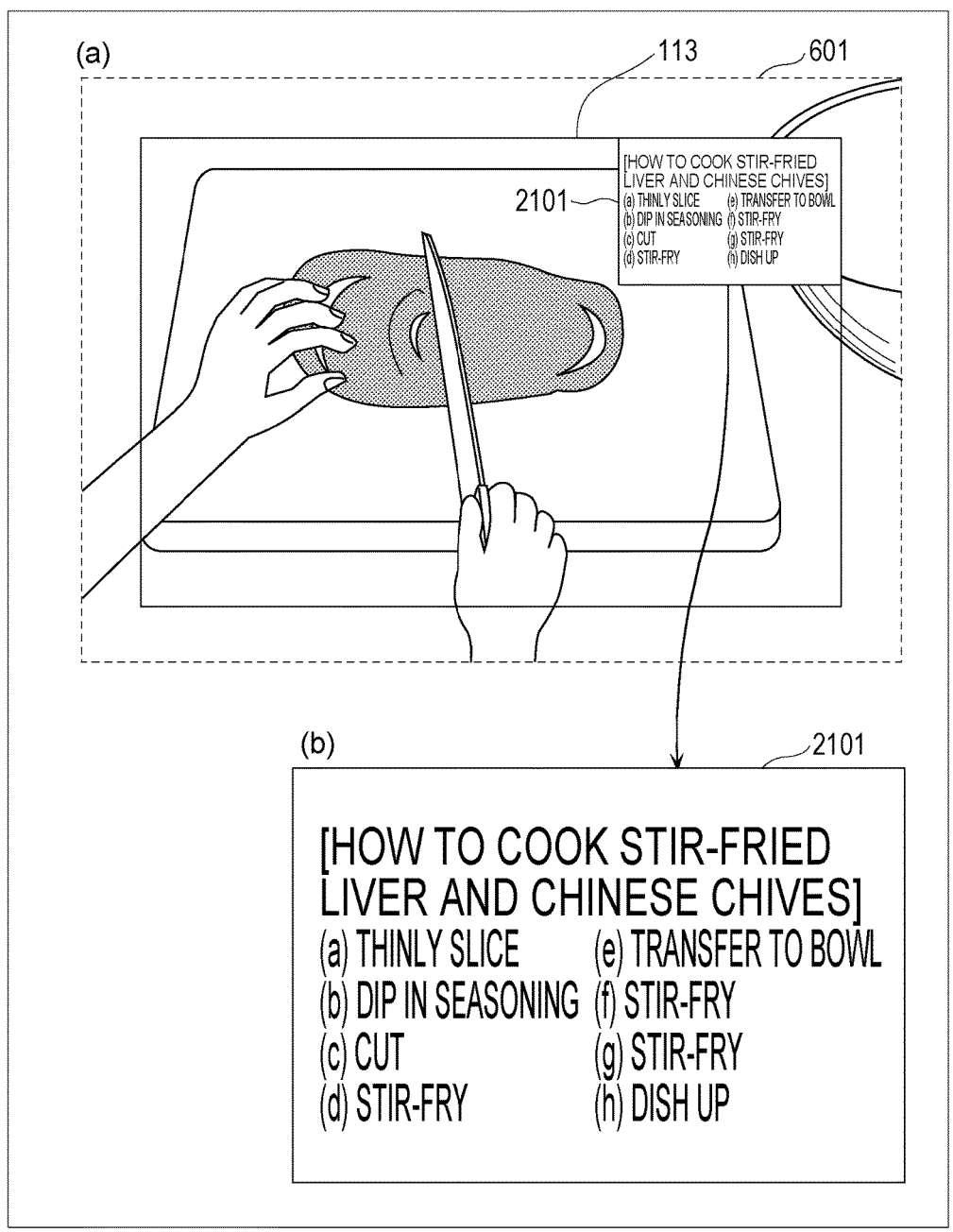
FIG. 21 is a diagram illustrating another example of a field of view of a user and an image (second image) displayed on a display device according to an alternative embodiment.

In a case where the first image includes a plurality of operation processes as with the image 1801 shown in FIG. 18, then, for example, as illustrated in FIG. 21, in the switching to the second image from the first image, each operation process in the plurality of operation processes displayed in the first image may be represented in a simplified manner in an image 2101, and the image 2101 may be displayed as the second image. In the example of the image 2101 shown in FIG. 21, operation processes (a) to (h) are displayed in a simplified manner using a reduced amount of text. This allows the user to perform operations while seeing the descriptions of the respective operation processes. Note that FIG. 21 is a diagram illustrating another example of a field of view of a user and an image (second image) displayed on a display device according to an alternative embodiment. FIG. 21(b) is a diagram illustrating in an enlarged manner the image 2101 shown in FIG. 21(a).

In the embodiments described above, the inclination detection unit 111 is realized using the acceleration sensor 105. Alternatively, a gyroscope sensor or a terrestrial magnetism sensor may be used, or at least two of the acceleration sensor, the gyroscope sensor, and the terrestrial magnetism sensor may be combined.

In the embodiments described above, a cooking process of a recipe is represented as the operation process in the first image and the second image (also in the third image in the second embodiment, and further in the fourth image in the third embodiment). Alternatively, the operation process may be an operation process of attaching an electronic part, an operation process of an operation using a device or a tool, an operation process associated with repair or maintenance of a device, an operation process associated with repair or maintenance of an appliance, or an operation process associated with repair or maintenance of a building.

In the embodiments described above, although not stated, the first image and the second image may be received from an information processing apparatus (such as a smartphone, a tablet, a laptop PC, or the like) connected to the head-mounted display 10 via a network. More specifically, the head-mounted display 10 may include only the inclination detection unit 111 and the display device 113, and the functions of the control unit 112 may be provided by an information processing apparatus connected to the head-mounted display 10 via the network.

In the embodiments, although not described above, the first image may be received from an information processing apparatus connected to the head-mounted display 10 via a network, and the second image may be generated in the head-mounted display 10 based on the received first image. That is, the head-mounted display 10 may have a function of generating the second image based on the acquired first image according to a particular algorithm.

In the embodiments described above, each component may be realized using dedicated hardware or may be realized by executing a software program corresponding to the component. Each component may be realized by a program execution unit such as a CPU, a processor, or the like by reading out a software program stored in a storage medium such as a hard disk, a semiconductor memory, or the like and executing the software program.

Display control methods and head-mounted displays according to one or more aspects of the present disclosure have been described above with reference to embodiments. However, the present disclosure is not limited to the embodiments descried above. It will be apparent to those skilled in the art that many various modifications may be made to the embodiments, and constituent elements of different embodiments may be combined without departing from the spirit and scope of the present disclosure. Note that any resultant modification and combination also falls within the scope of the present disclosure.

The display control method and related techniques disclosed herein are useful for a user to switch an image representing an operation process, without having to stop an operation and move his/her hand off, to a reduced-size image or a simplified image that does not interfere with the operation of the user.

What is claimed is:

1. A method causing a processor of a head-mounted display to execute operations, comprising:
receiving information indicating an inclination of the head-mounted display including a display that displays an image;
judging a posture of the head-mounted display based on the information received indicating the inclination;
in a case where the posture of the head-mounted display is a first posture, displaying on a display a first image (i) representing an operation process performed by a user and (ii) superimposed in a field of view of the user; and
in a case where it is determined that the posture of the head-mounted display has changed from the first posture to a second posture, switching the image displayed on the display to a second image having a display area smaller than that of the first image,
wherein the second image is a reduced content image in which information of the first image is omitted,
wherein the operations executed by the processor of the head-mounted display further include
in a case where it is determined that after the image displayed on the display has been changed from the first image to the second image, measuring time elapsed from an occurrence of a change in the posture of the head-mounted display from the first posture to the second posture,
in a case wherein it is determined that after the elapsed time measured has not reached a predetermined value, the posture of the head-mounted display has changed from the second posture to the first posture, switching the image displayed on the display from the second image to the first image, and
in a case where it is determined that after the elapsed time measured has reached the predetermined value, the posture of the head-mounted display has changed from the second posture to the first posture, switching the image displayed on the display from the second image to a third image, wherein the third image represents an operation process subsequent to the operation process represented in the first image.

2. The method according to claim 1,
wherein the first image and the second image each include text; and
in the switching to the second image, the first image is switched to the second image which is an image including text obtained by reducing the amount of text in the first image.

3. The method according to claim 1,
wherein the first image represents a plurality of operation processes, and
in the switching to the second image, the first image is switched to the second image which is an image obtained by deleting at least one operation process of the plurality of operation processes.

4. The method according to claim 1,
wherein the first image represents a plurality of operation processes, and
in the switching to the second image, the first image is switched to the second image which is an image including content representing at least one operation process of the plurality of operation processes.

5. The method according to claim 1,
wherein the first image represents a plurality of operation processes, and
in the switching to the second image, the first image is switched to the second image which is an image including content representing each operation process of the plurality of operation processes.

6. The method according to claim 1,
wherein in the switching to the third image, the predetermined value varies depending on the content represented in the first image.

7. The method according to claim 1,
wherein the operations executed by the processor of the head-mounted display further comprise:
in a case where it is determined that the posture of the head-mounted display has changed from the first posture or the second posture to a third posture, switching the image displayed on the display to a fourth image representing a complete state of the operation process represented in the first image.

8. The method according to claim 1,
wherein the operation process represented in the first image and the second image is one of a cooking operation process of a recipe, an operation process of attaching an electronic part, an operation process of an operation using a device or a tool, an operation process associated with repair or maintenance of a device, an operation process associated with repair or maintenance of an appliance, and an operation process associated with repair or maintenance of a building.

9. The method according to claim 1,
wherein the operations executed by the processor of the head-mounted display further comprise:
receiving the first image and the second image via a network from an information processing apparatus connected to the head-mounted display.

10. The method according to claim 1,
wherein the operations executed by the processor of the head-mounted display further comprise:
receiving the first image via a network from an information processing apparatus connected to the head-mounted display; and
generating the second image based on the received first image.

11. A head-mounted display, comprising:
a display that display an image;
a processor; and
a memory having a program stored thereon, the program causing the processor to execute operations, including
detecting information indicating an inclination of the head-mounted display,
determining a posture of the head-mounted display based on the information detected indicating the inclination,
in a case where the posture of the head-mounted display is a first posture, displaying on the display a first image representing an operation process performed by a user and superimposed in a field of view of the user, and
in a case where it is determined that the posture of the head-mounted display has changed from the first posture to a second posture, switching the image displayed on the display from the first image to a second image having a display area smaller than that of the first image,
wherein the second image is a reduced content image in which information of the first image is omitted,
wherein the operations executed by the processor of the head-mounted display further include
in a case where it is determined that after the image displayed on the display has been changed from the first image to the second image, measuring time elapsed from an occurrence of a change in the posture of the head-mounted display from the first posture to the second posture,
in a case wherein it is determined that after the elapsed time measured has not reached a predetermined value, the posture of the head-mounted display has changed from the second posture to the first posture, switching the image displayed on the display from the second image to the first image, and
in a case where it is determined that after the elapsed time measured has reached the predetermined value, the posture of the head-mounted display has changed from the second posture to the first posture, switching the image displayed on the display from the second image to a third image, wherein the third image represents an operation process subsequent to the operation process represented in the first image.

12. A non-transitory recording medium having a program stored thereon, the program causing a processor to execute operations, comprising:
receiving information indicating an inclination of a head-mounted display including a display that displays an image;
determining a posture of the head-mounted display based on the information received indicating the inclination;
in a case where the posture of the head-mounted display is a first posture, displaying on the display a first image representing an operation process performed by a user and superimposed in a field of view of the user; and
in a case where it is determined that the posture of the head-mounted display has changed from the first posture to a second posture, switching the image displayed on the display to a second image having a display area smaller than that of the first image,
wherein the second image is a reduced content image in which information of the first image is omitted,
wherein the operations executed by the processor of the head-mounted display further include
in a case where it is determined that after the image displayed on the display has been changed from the first image to the second image, measuring time elapsed from an occurrence of a change in the posture of the head-mounted display from the first posture to the second posture,
in a case wherein it is determined that after the elapsed time measured has not reached a predetermined value, the posture of the head-mounted display has changed from the second posture to the first posture, switching the image displayed on the display from the second image to the first image, and
in a case where it is determined that after the elapsed time measured has reached the predetermined value, the posture of the head-mounted display has changed from the second posture to the first posture, switching the image displayed on the display from the second image to a third image, wherein the third image represents an operation process subsequent to the operation process represented in the first image.

* * * * *